(12) United States Patent
Yamanaka

(10) Patent No.: US 8,965,120 B2
(45) Date of Patent: Feb. 24, 2015

(54) IMAGE PROCESSING APPARATUS AND METHOD OF CONTROLLING THE SAME

(71) Applicant: Canon Kabushiki Kaisha, Tokyo (JP)

(72) Inventor: Yohei Yamanaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 96 days.

(21) Appl. No.: 13/751,253

(22) Filed: Jan. 28, 2013

(65) Prior Publication Data

US 2013/0202204 A1 Aug. 8, 2013

(30) Foreign Application Priority Data

| Feb. 2, 2012 | (JP) | ................................. 2012-021338 |
| Feb. 2, 2012 | (JP) | ................................. 2012-021342 |
| Feb. 2, 2012 | (JP) | ................................. 2012-021343 |

(51) Int. Cl.
| G06K 9/00 | (2006.01) |
| G06K 9/40 | (2006.01) |
| G06T 5/00 | (2006.01) |
| G06T 5/50 | (2006.01) |

(52) U.S. Cl.
CPC ................. *G06T 5/007* (2013.01); *G06T 5/004* (2013.01); *G06T 5/003* (2013.01); *G06T 5/50* (2013.01); *G06T 2207/10144* (2013.01); *G06T 2207/20208* (2013.01); *G06T 2207/20221* (2013.01)
USPC .......................................... 382/167; 382/255

(58) Field of Classification Search
USPC ................................................ 382/167, 255
See application file for complete search history.

(56) References Cited

U.S. PATENT DOCUMENTS

| 5,905,817 | A  | * | 5/1999  | Matama | ........................ 382/260 |
| 7,177,481 | B2 | * | 2/2007  | Kaji   | .............................. 382/265 |
| 2006/0098255 | A1 |   | 5/2006  | Hyodo |   |
| 2006/0279660 | A1 |   | 12/2006 | Ali   |   |
| 2009/0060374 | A1 |   | 3/2009  | Wang  |   |
| 2010/0328490 | A1 |   | 12/2010 | Kurane et al. |   |
| 2012/0002082 | A1 |   | 1/2012  | Johnson et al. |   |

FOREIGN PATENT DOCUMENTS

| JP | 5-167852 A   | 7/1993 |
| JP | 2000-50173 A | 2/2000 |
| JP | 2009-17200 A | 1/2009 |

OTHER PUBLICATIONS

European Search Report issued in corresponding application No. 13153386.1 on Nov. 29, 2013.
Block M et al: "Multi-Exposure Document Fusion Based on Edge-Intensities", Document Analysis and Recognition, 2009, ICDAR '09, 10th International Conference on, IEEE, Piscataway, NJ, USA, Jul. 26, 2009, pp. 136-140, XP031540503.

(Continued)

*Primary Examiner* — Yon Couso
(74) *Attorney, Agent, or Firm* — Carter, DeLuca, Farrell & Schmidt, LLP

(57) ABSTRACT

Disclosed is an image processing apparatus for converting an original image. Processing of blurring an input original image is performed to generate a blurred image. A difference image that is the difference between the original image and an adjusted image obtained by adjusting the density of the blurred image is generated. The difference image and the original image are composited based on the density of the difference image and the density of the original image. This allows to easily obtain a painting-like effect even in, for example, a low-contrast portion of an image.

12 Claims, 27 Drawing Sheets

(56) References Cited

OTHER PUBLICATIONS

Mertens T et al., "Exposure Fusion", Computer Graphics and Applications, 2007, PG '07, 15th Pacific Conference on, IEEE, Piscataway, NJ, USA, Oct. 29, 2007, pp. 382-390, XP031338475.

Goshtasby et al., "Fusion of multi-exposure images", Image and Vision Computing, Elsevier, Guildford, GB, vol. 23, No. 6, Jun. 1, 2005, pp. 611-618, XP027617890.

"Unsharp mask," everything2.com, Oct. 24, 2002.

"Sharpening: Unsharp Mask," cambridgeincolour.com, Jan. 5, 2013.

"Unsharp masking," Wikipedia, the free encyclopedia, Apr. 30, 2013.

"Blend modes," Wikipedia, the free encyclopedia, May 7, 2013.

Search Report issued on Jun. 19, 2013 in counterpart European Application No. 13153386.1.

\* cited by examiner

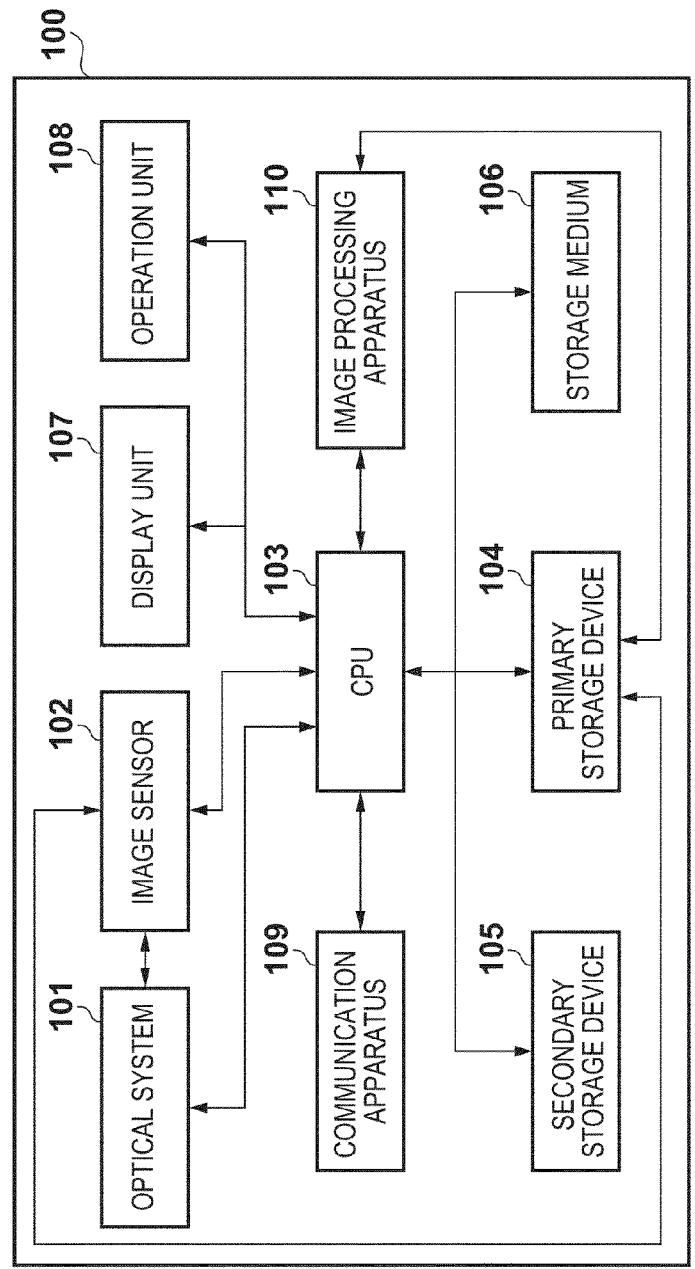
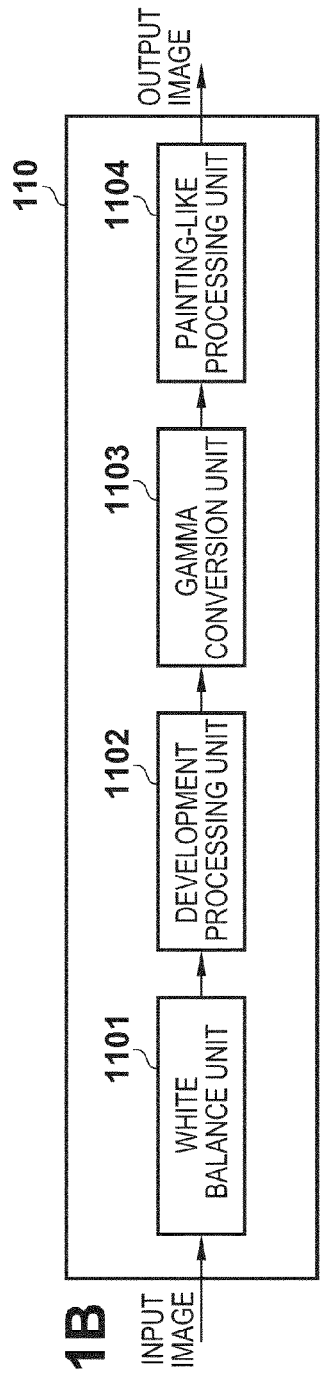
FIG. 1A
FIG. 1B

L1: INPUT IMAGE SIGNAL
L2: BLURRED IMAGE SIGNAL
L3: SIGNAL-ADJUSTED SIGNAL
L4: DIFFERENCE COMPUTING SIGNAL

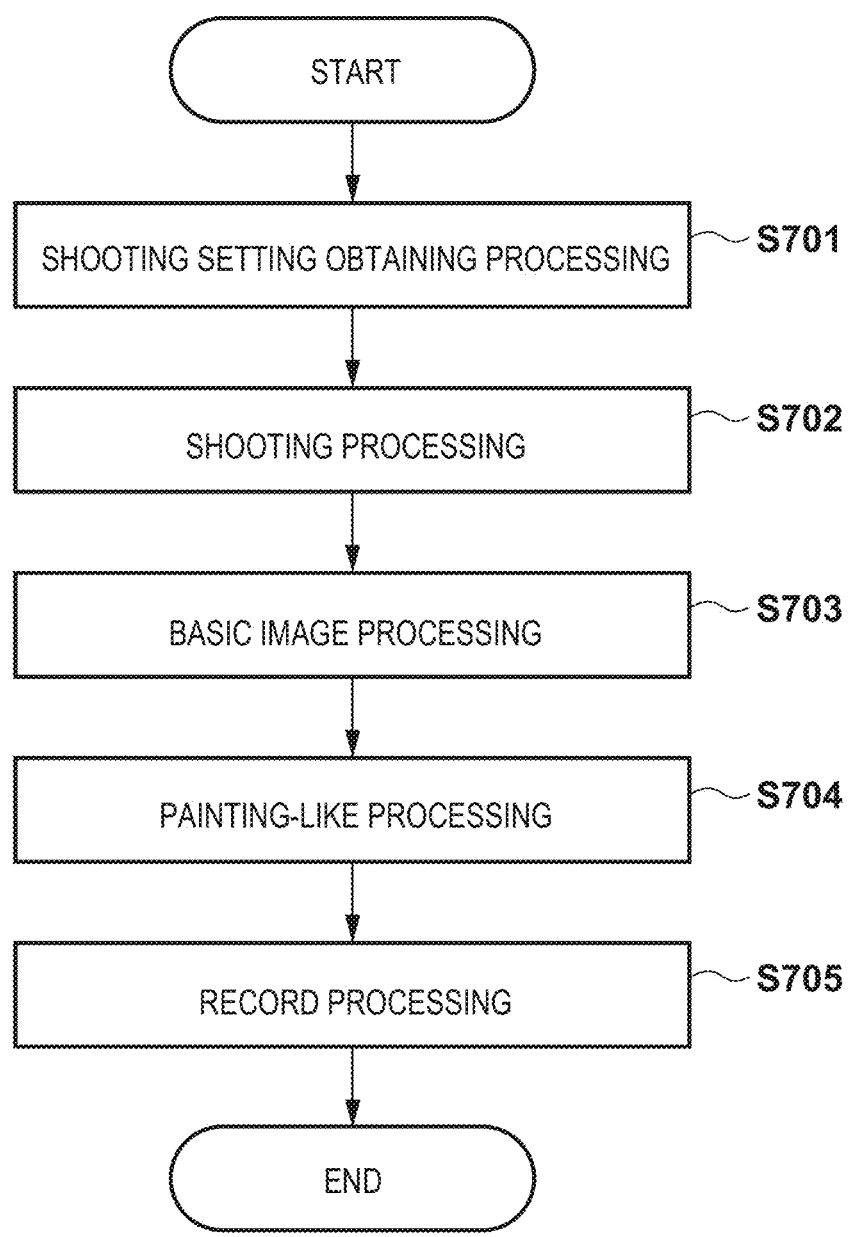

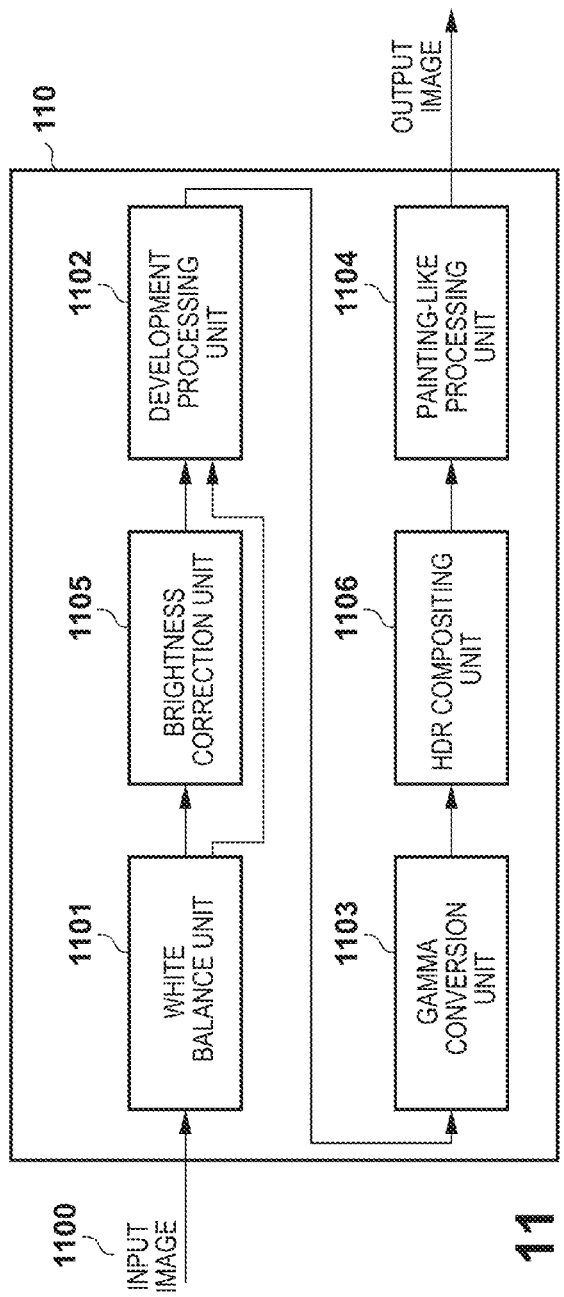
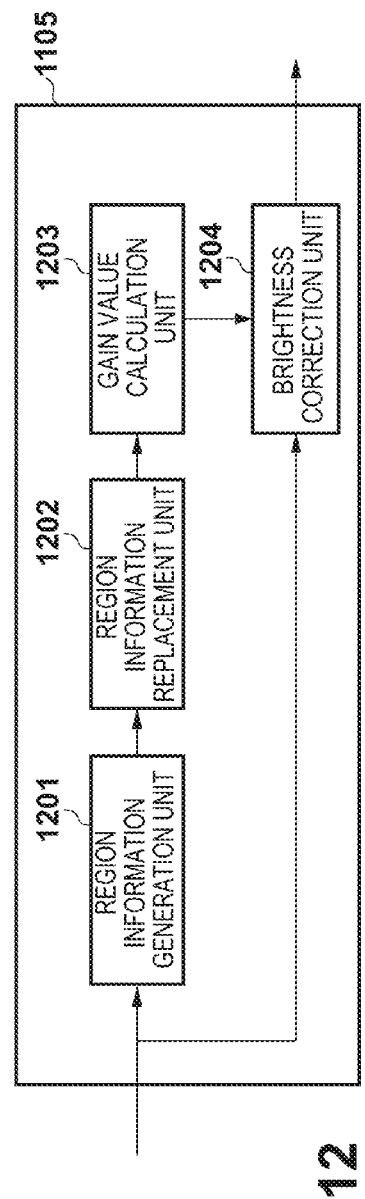
FIG. 11
FIG. 12

|   | 1 | | | | ... | | | | | | 12 |
|---|---|---|---|---|---|---|---|---|---|---|---|
| 1 | 7 | 9 | 9 | 9 | 10 | 13 | 14 | 15 | 15 | 15 | 15 |
|   | 8 | 8 | 7 | 8 | 10 | 13 | 14 | 15 | 15 | 15 | 15 |
|   | 9 | 10 | 9 | 10 | 9 | 10 | 10 | 14 | 15 | 15 | 15 |
| ⋮ | 12 | 12 | 12 | 12 | 10 | 2 | 2 | 11 | 15 | 15 | 15 |
|   | 12 | 12 | 12 | 12 | 9 | 2 | 2 | 12 | 15 | 15 | 15 |
|   | 10 | 11 | 11 | 11 | 8 | 1 | 1 | 9 | 14 | 14 | 14 |
|   | 10 | 11 | 11 | 11 | 8 | 1 | 1 | 9 | 14 | 14 | 13 |
| 8 | 10 | 10 | 10 | 11 | 8 | 1 | 1 | 9 | 14 | 14 | 13 | 12 |

LOOKUP TABLE CHARACTERISTIC
FOR UNDEREXPOSURE IMAGE

LOOKUP TABLE CHARACTERISTIC
FOR OVEREXPOSURE IMAGE

LOOKUP TABLE CHARACTERISTIC
FOR CORRECT EXPOSURE IMAGE

F I G. 20
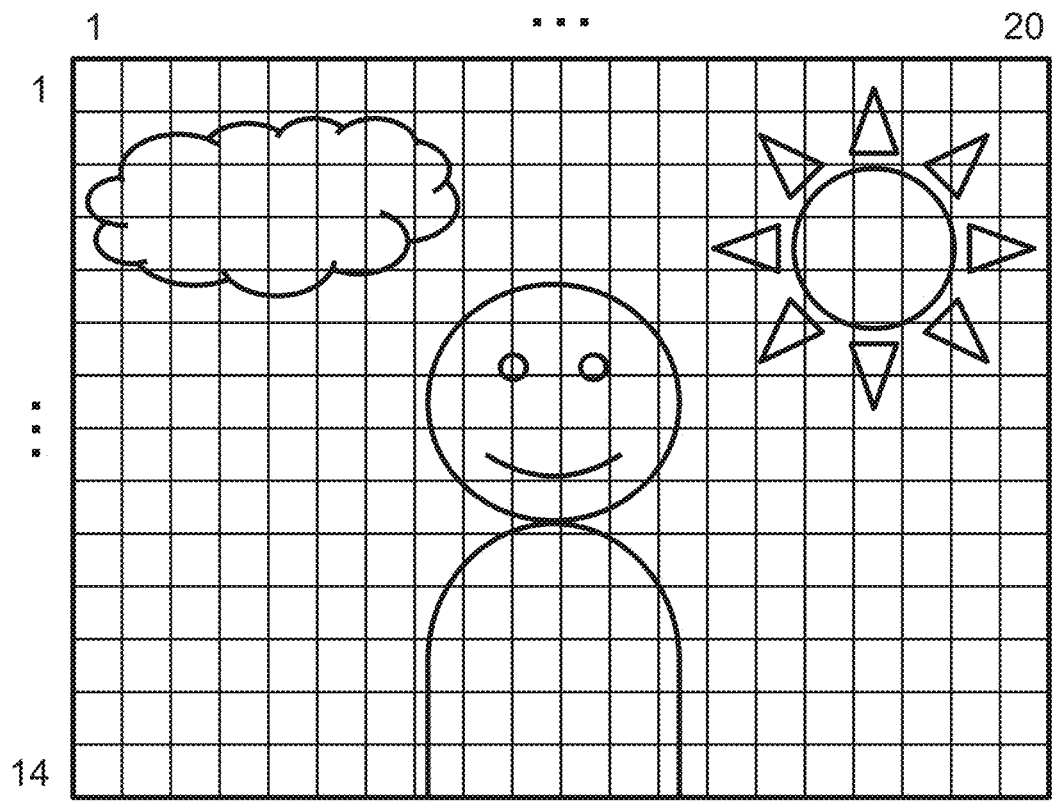

F I G. 31
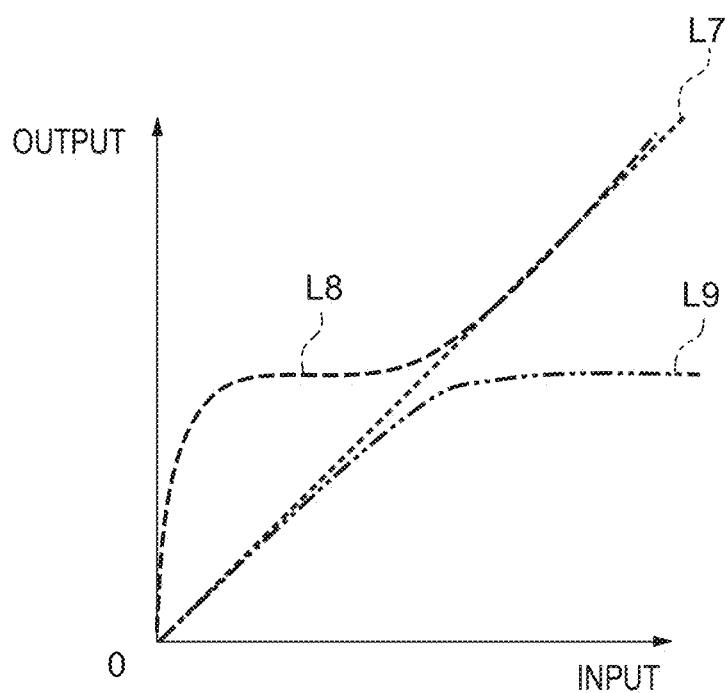
L7: REFERENCE IMAGE GAMMA CURVE (CORRECT EXPOSURE)
L8: COMPOSITED IMAGE GAMMA CURVE (UNDEREXPOSURE)
L9: COMPOSITED IMAGE GAMMA CURVE (OVEREXPOSURE)

IMAGE PROCESSING APPARATUS AND METHOD OF CONTROLLING THE SAME

BACKGROUND OF THE INVENTION

1. Field of the Invention

The present invention relates to an image processing apparatus for performing processing of adding a special effect to an image by, for example, processing an original image such as a captured image into a painting-like image and a method of controlling the same.

2. Description of the Related Art

An image sharpening method conventionally extracts edge portions such as contours and borders included in an original image and manipulates them, thereby enhancing the edges of the original image. An image that expresses its contours and borders in this way as linear features can give a strong impression to a viewer.

One of the expressions using this method is a painting-like image that looks like an oil painting, a watercolor painting, a colored pencil drawing, or a pastel drawing. A corona called a halo that appears around an object image is also sometimes preferred as the expression of the painting-like image. Note that the painting-like image in this specification is defined as an image having gradation in a flat portion without contours and borders.

In the related art, however, the edge enhancement is not performed in a flat portion without contours and borders. Since the portion is smooth, and no gradation appears, the image lacks aesthetic appeal. For example, in Japanese Patent Laid-Open No. 5-167852, processing of enhancing contour portions is performed. In this case, no gradation appears in flat portions. To generate a halo, the contrast is enhanced. For example, Japanese Patent Laid-Open No. 2009-17200 discloses adjusting a gamma curve used for gamma correction to improve the contrast on the white side or black side of an image. In the method of Japanese Patent Laid-Open No. 2009-17200, however, since a single gamma curve is applied to the whole processing target image, it is difficult to generate an appropriate halo that makes a processing target image having low contrast look like a painting.

SUMMARY OF THE INVENTION

The present invention has been made in consideration of the above-described problems of the related art, and provides an image processing apparatus that implements an improved method of converting an original image into a painting-like image and a method of controlling the same.

According to one aspect of the present invention, there is provided an image processing apparatus for converting an original image, comprising: an adjustment unit configured to apply processing of blurring an image and processing of adjusting a density for the original image to generate an adjusted image; a computing unit configured to generate a difference image that is a difference between the original image and the adjusted image obtained by the adjustment unit; and a compositing unit configured to composite the difference image and the original image based on a density of the difference image obtained by the computing unit and a density of the original image.

According to another aspect of the present invention, there is provided a method of controlling an image processing apparatus for converting an original image, comprising: an adjustment step of applying processing of blurring an image and processing of adjusting a density for the original image to generate an adjusted image; a computing step of generating a difference image that is a difference between the original image and the adjusted image obtained in the adjustment step; and a compositing step of compositing the difference image and the original image based on a density of the difference image obtained in the computing step and a density of the original image.

According to another aspect of the present invention, there is provided a method of controlling an image processing apparatus for converting an original image, comprising: an adjustment step of applying processing of blurring an image and processing of adjusting a density for the original image to generate an adjusted image; a computing step of generating a difference image that is a difference between a density of the original image and a density of the adjusted image obtained in the adjustment step; and a compositing step of compositing the difference image and the original image based on a density of the difference image obtained in the computing step and a density of the original image.

According to another aspect of the present invention, there is provided an image processing apparatus comprising: an obtaining unit configured to obtain a plurality of images shot under a plurality of exposures including correct exposure; a white balance adjustment unit configured to perform white balance adjustment for each of the plurality of images; a brightness correction unit configured to perform brightness correction for each of the plurality of white-balance-adjusted images by applying a gain determined using a pixel position and a gain corresponding to a representative brightness of each of a plurality of regions obtained by dividing the image to each pixel; a compositing unit configured to generate a composited image by compositing the plurality of brightness-corrected images; and a control unit configured to control at least one of a range and an intensity of a halo generated around an edge portion of the composited image by controlling at least one of a size of the region and the gain of each region, thereby converting the composited image.

According to another aspect of the present invention, there is provided a method of controlling an image processing apparatus, comprising: an obtaining step of obtaining a plurality of images shot under a plurality of exposures including correct exposure; a white balance adjustment step of performing white balance adjustment for each of the plurality of images; a brightness correction step of performing brightness correction for each of the plurality of white-balance-adjusted images by applying a gain determined using a pixel position and a gain corresponding to a representative brightness of each of a plurality of regions obtained by dividing the image to each pixel; a compositing step of generating a composited image by compositing the plurality of brightness-corrected images; and a control step of controlling at least one of a range and an intensity of a halo generated around an edge portion of the composited image by controlling at least one of a size of the region and the gain of each region, thereby converting the composited image.

According to another aspect of the present invention, there is provided an image processing apparatus comprising: an obtaining unit configured to obtain a plurality of images shot under a plurality of exposures; a white balance adjustment unit configured to perform white balance adjustment for each of the plurality of images; a brightness correction unit configured to perform brightness correction for each of the plurality of white-balance-adjusted images; a determination unit configured to determine a compositing ratio of the plurality of images in accordance with a brightness of an image which is one of the plurality of white-balance-adjusted images and is not brightness-corrected; and a compositing unit configured to composite the plurality of brightness-corrected images at the ratio determined by the determination unit.

According to another aspect of the present invention, there is provided an image processing apparatus comprising: an obtaining unit configured to obtain a plurality of images shot under a plurality of exposures; a white balance adjustment unit configured to perform white balance adjustment for each of the plurality of images; a gamma correction unit configured to perform, for an image shot under correct exposure out of the plurality of white-balance-adjusted images, gamma correction using a gamma curve for the image shot under the correct exposure, and performing, for image data that is not shot under the correct exposure, gamma correction using a gamma curve different from the gamma curve for the image shot under the correct exposure; a determination unit configured to determine a compositing ratio of the plurality of images in accordance with a brightness of an image which is one of the plurality of white-balance-adjusted image data and is gamma-corrected using the gamma curve for the image shot under the correct exposure; and a compositing unit configured to composite the plurality of gamma-corrected images at the ratio determined by the determination unit.

According to another aspect of the present invention, there is provided an image capture apparatus comprising an image processing apparatus according to the present invention.

According to another aspect of the present invention, there is provided a method of controlling an image processing apparatus, comprising: an obtaining step of obtaining a plurality of images shot under a plurality of exposures; a white balance adjustment step of performing white balance adjustment for each of the plurality of images; a brightness correction step of performing brightness correction for each of the plurality of white-balance-adjusted images; a determination step of determining a compositing ratio of the plurality of images in accordance with a brightness of an image which is one of the plurality of white-balance-adjusted images and is not brightness-corrected; and a compositing step of compositing the plurality of brightness-corrected images at the ratio determined in the determination step.

According to another aspect of the present invention, there is provided a method of controlling an image processing apparatus, comprising: an obtaining step of obtaining a plurality of images shot under a plurality of exposures; a white balance adjustment step of performing white balance adjustment for each of the plurality of images; a gamma correction step of performing, for an image shot under correct exposure out of the plurality of white-balance-adjusted images, gamma correction using a gamma curve for the image shot under the correct exposure, and performing, for image data that is not shot under the correct exposure, gamma correction using a gamma curve different from the gamma curve for the image shot under the correct exposure; a determination step of determining a compositing ratio of the plurality of images in accordance with a brightness of an image which is one of the plurality of white-balance-adjusted image data and is gamma-corrected using the gamma curve for the image shot under the correct exposure; and a compositing step of compositing the plurality of gamma-corrected images at the ratio determined in the determination step.

According to further aspect of the present invention, there is provided a non-transitory computer-readable recording medium that stores a program causing a computer to function as each unit of an image processing apparatus according to the present invention.

Further features of the present invention will become apparent from the following description of exemplary embodiments with reference to the attached drawings.

BRIEF DESCRIPTION OF THE DRAWINGS

FIGS. 1A and 1B are block diagrams showing the arrangement of an image capture apparatus according to the first embodiment of the present invention;

FIG. 7 is a flowchart showing the operation of the image capture apparatus according to the first embodiment;

FIG. 11 is a block diagram showing an example of the arrangement of an image capture apparatus 100 as an example of an image processing apparatus according to the third embodiment of the present invention;

FIG. 12 is a block diagram of a brightness correction unit according to the third embodiment out of an image processing apparatus 110 included in the image capture apparatus 100 shown in FIG. 11;

FIG. 20 is a view showing another example of a divided region size according to the third embodiment of the present invention;

FIG. 31 is a graph showing examples of a reference image gamma curve and a composited image gamma curve used in the sixth embodiment of the present invention.

DESCRIPTION OF THE EMBODIMENTS

Figure 2:
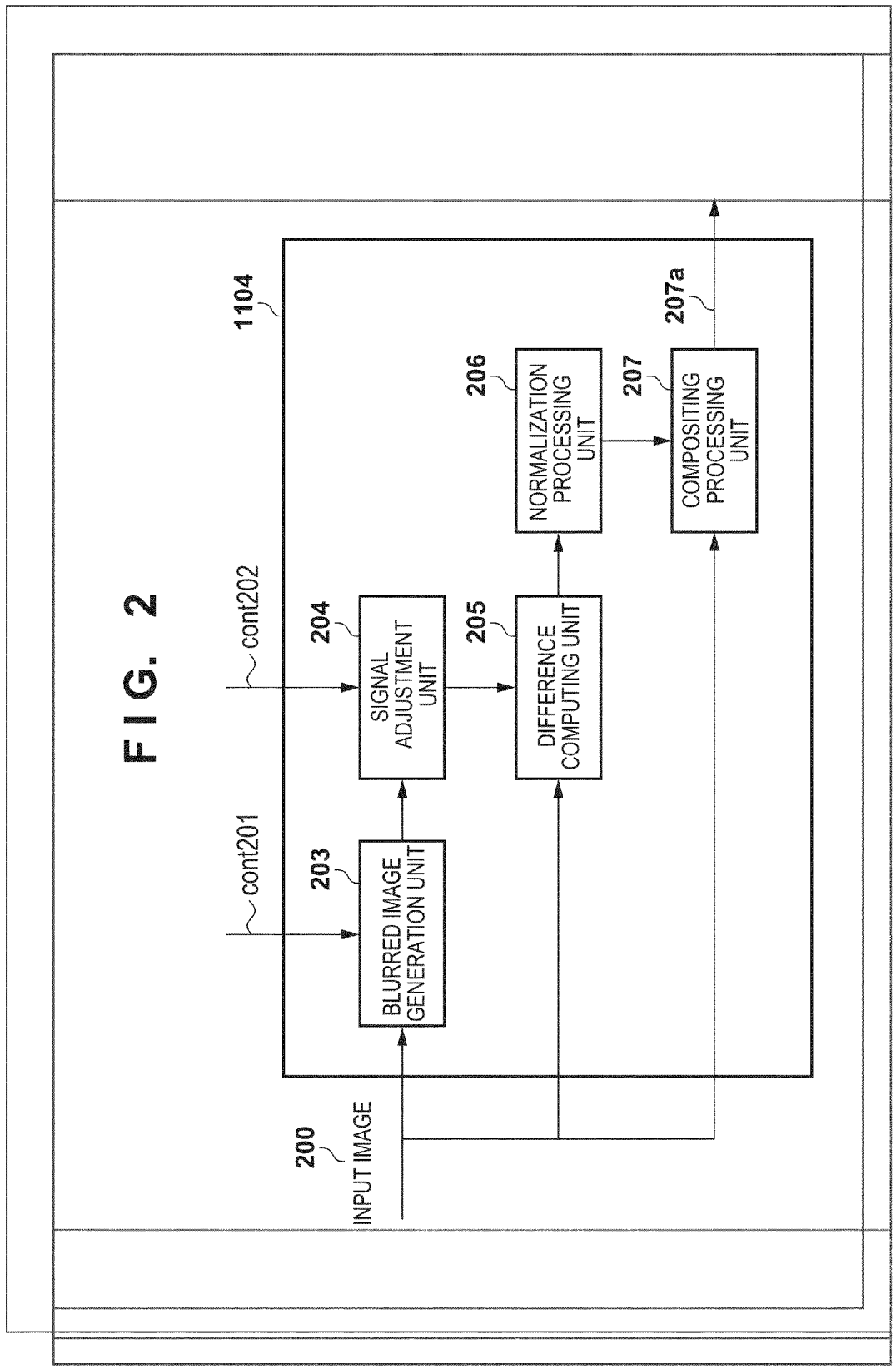
FIG. 2 is a block diagram showing an example of the arrangement of a painting-like processing unit according to the first embodiment.

Exemplary embodiments of the present invention will now be described in detail in accordance with the accompanying drawings.

(First Embodiment)

FIG. 1A is a block diagram showing the arrangement of an image capture apparatus 100 that is an example of an image processing apparatus according to the first embodiment of the present invention. The image capture apparatus 100 includes an apparatus for capturing an object and obtaining image data, such as a digital camera or a digital video camera. Referring to FIG. 1A, an optical system 101 is formed from a lens, a shutter, and a stop, and exposes an image sensor 102 by an optical image of an object. The image sensor 102 such as a CCD image sensor or a CMOS image sensor converts the optical image formed by the optical system 101 into brightness information on a pixel basis. A CPU 103 functioning as a control unit controls the respective units of the image capture apparatus 100 in accordance with input signals and programs stored beforehand, thereby implementing the functions of the image capture apparatus 100. Note that in the following explanation, at least some of the functions implemented by causing the CPU 103 to execute the programs may be implemented by dedicated hardware such as an ASIC.

A primary storage device 104 is a volatile storage device such as a RAM, and is used by the CPU 103 to operate. A secondary storage device 105 is a nonvolatile storage device such as an EEPROM, and stores programs (firmware) and various kinds of setting information used to control the image capture apparatus 100. A storage medium 106 stores image data obtained by shooting and the like. Note that the storage medium 106 is removable from the image capture apparatus 100, like, for example, a semiconductor memory card. The stored data can be read out by another apparatus such as a personal computer. That is, the image capture apparatus 100 has the removing mechanism and the read/write function of the storage medium 106. A display unit 107 displays a viewfinder image at the time of shooting, a shot image, a GUI image used for an interactive operation, and the like. An operation unit 108 is an input device group for accepting user operations and can include an input device using voice, a line of sight, and the like, as well as, for example, buttons, levers, and a touch panel.

Note that the image capture apparatus 100 according to this embodiment has a plurality of image processing patterns to be applied to a captured image by an image processing apparatus 110, and can set a pattern as an image capture mode from the operation unit 108. Examples are a pattern to finish a captured image slightly vividly by emphasizing color saturation, a pattern to finish an image to standard tones, a pattern to form a neutral image by toning down color saturation, and a pattern for a portrait image to perform image processing while giving importance to the skin tones of a person. In, for example, the portrait mode, image processing is performed while placing emphasis on the tone and smoothness of the skin tones of a person. Hence, this mode is suitable when taking a close-up shot of a person, and more particularly, of a woman or a child.

A communication apparatus 109 is connected to an external apparatus and transmits/receives control commands and data. As the protocol used to establish connection to an external apparatus and perform data communication, for example, PTP (Picture Transfer Protocol) is used. Note that the communication apparatus 109 can perform the communication with the external apparatus either by wired connection using a USB (Universal Serial Bus) cable or the like, or by wireless connection using a wireless LAN or the like. The communication apparatus 109 can be connected to the external apparatus either directly or via a server or a network such as the Internet.

The image processing apparatus 110 performs image processing, including so-called development processing, and also tone adjustment corresponding to a shooting mode. Processing of compositing a plurality of images of under different exposures to generate a composited image having a wider dynamic range is also performed by the image processing apparatus 110. The data of the plurality of images to be composited are stored in, for example, the primary storage device 104. At least some of the functions of the image processing apparatus 110 may the implemented by the CPU 103 as software.

FIG. 1B illustrates the internal arrangement of the image processing apparatus 110. A white balance unit 1101 performs processing of accurately reproducing white color in an image. More specifically, gains that equalize R, G, and B intensities in a region that should be white in an image are applied to the R, G, and B, respectively. A development processing unit 1102 performs so-called development processing such as matrix conversion processing or interpolation processing of interpolating a color mosaic image so as to generate a color image in which every pixel has R, G, and B color information. A gamma conversion unit 1103 performs gamma conversion for the image data after development. In this embodiment, the density value of each pixel of the image data at this point of time is expressed by 8 bits (0 to 255). The gamma-converted image data is input to a painting-like processing unit 1104 which applies painting-like processing as the characteristic feature of this embodiment and outputs the processed image.

Details of the internal arrangement and operation of the painting-like processing unit 1104 will be described below.

FIG. 2 is a block diagram showing an example of the arrangement of the painting-like processing unit according to the first embodiment used to convert an original image into a painting-like image. Each unit of the painting-like processing unit 1104 is configured as follows.

A blurred image generation unit 203 is a circuit that blurs an input image 200 by reducing the image of an input image signal input from the primary storage device 104 and then enlarging it to the original image size. Note that the blurred image need not always be generated by this method and can also be generated using known blurring processing such as filter processing. When blurring is performed by filter processing, the shape of the frequency band can be controlled more finely, though the computing takes time as compared to the blurring processing using reduction and enlargement.

If the input image 200 is an image generated by compositing a plurality of images (image capture signals) shot by the image capture apparatus 100 while changing the exposure, and has a wide dynamic range but neither blown-out highlights nor blocked-up shadows, a more excellent effect of painting-like image conversion can be expected. The image signal to be processed here is assumed to be an RGB or YUV signal. However, the processing may be done for a signal that has undergone de-mosaicing but not gamma conversion or matrix processing. The blurred image generation unit 203 is configured to adjust the reduction ratio and the enlargement ratio by an external control signal cont201.

Figure 3A:
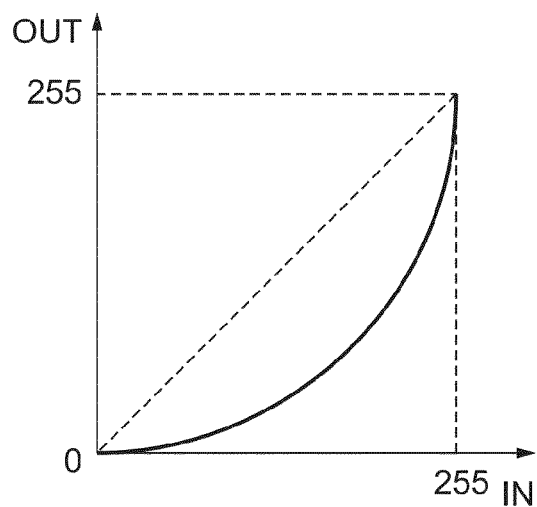
FIGS. 3A to 3C are graphs showing conversion curves given to adjust a density value.

A signal adjustment unit 204 is a circuit that receives a blurred image signal given by the blurred image generation unit 203 and lowers the density value of the input image signal as a whole, thereby generating a signal adjusted image. The signal adjustment unit 204 is configured to change the conversion curve by an external control signal cont202. Note that FIG. 3A shows an example of the conversion curve given to lower the density value.

A difference computing unit 205 is a circuit that receives the input image signal and the signal adjusted signal given by the signal adjustment unit 204 and computes the difference between the density value of the input image signal and that of the signal adjusted signal, thereby generating a difference image that extracts a high-frequency component from the input image 200 but still contains low-frequency components.

Adjusting the reduction ratio and the enlargement ratio by the external control signal cont201 makes it possible to change the difference computing result between the density value of the input image signal and that of the signal adjusted signal and thus change (adjust) the thickness of the halo of the composited image given by a composited image signal 207a.

In this embodiment, when the shooting mode is changed (the shooting setting is changed) to landscape via the operation unit 108, the apparatus should generate an impressive image having distinct contours and borders and add a thick halo to the contour portions. Hence, the reduction ratio and the enlargement ratio are increased by the external control signal cont201, thereby raising the degree of blur.

Adjusting the conversion curve by the external control signal cont202 makes it possible to change the difference computing result between the density value of the input image signal and that of the signal adjusted signal and thus change (adjust) the contrast enhancement level of the composited image given by the composited image signal 207a.

Figure 3B:
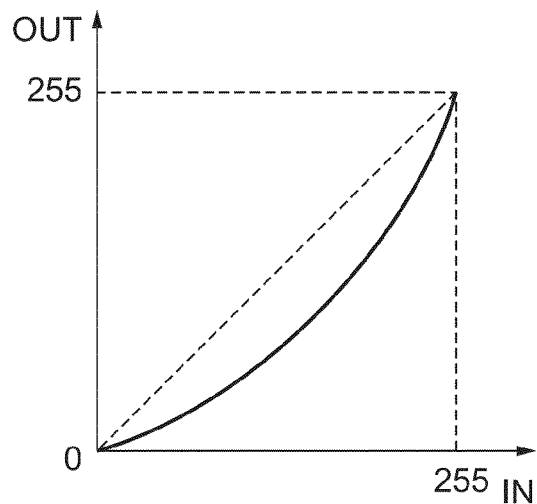

In this embodiment, when the shooting mode is changed to portrait via the operation unit 108, the apparatus should neither lose the skin quality of a person nor enhance the contrast. Hence, the curvature of the conversion curve convex downward is suppressed as shown in FIG. 3B as compared to that in the normal shooting mode shown in FIG. 3A.

Figure 3C:
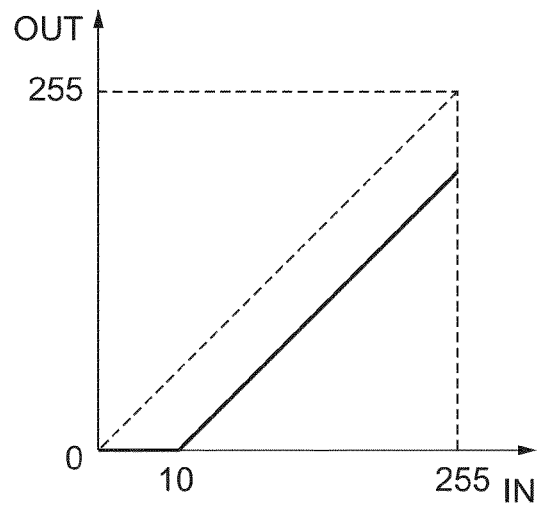

The conversion curve may be a straight line, as shown in FIG. 3C. This allows to prevent enhancement of the contrast between a low brightness portion and a high brightness portion, which occurs when the curve as shown in FIG. 3A or 3B is used.

Figure 4:
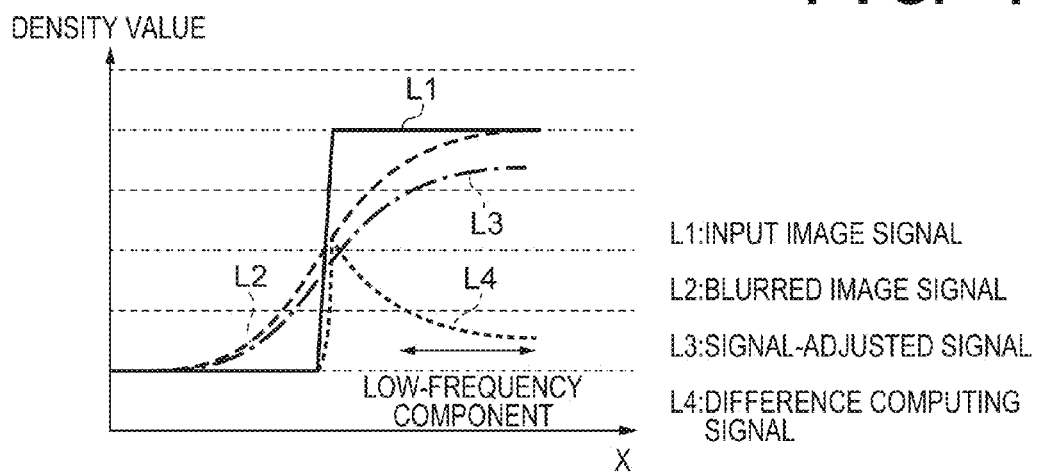
FIG. 4 is a graph showing waveforms before and after each processing of an image signal.

FIG. 4 is a graph showing the waveforms of an input image signal L1, a blurred image signal L2 given by the blurred image generation unit 203, a signal adjusted signal L3 given by the signal adjustment unit 204, and a difference computing signal L4 given by the difference computing unit 205. The abscissa represents the displacement of a pixel (x), and the ordinate represents the density value. A region having a step in the density value is extracted for the explanation. With the above-described processes, the image signal that extracts the edge of the input image 200 and also contains low-frequency components is obtained, as indicated by L4.

Figure 5A:
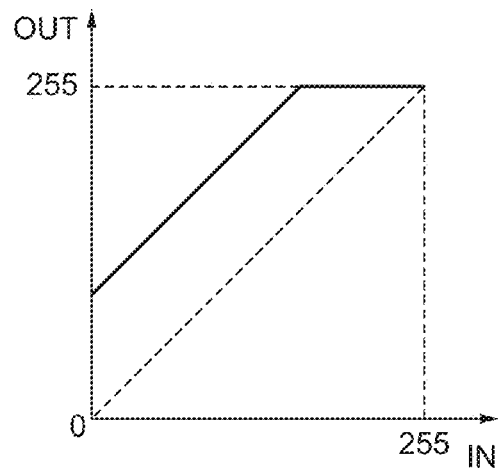
FIGS. 5A and 5B are graphs showing lines curves given to increase a density value.
Figure 5B:
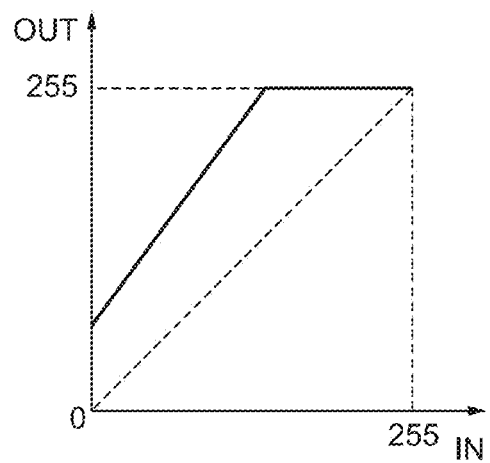

A normalization processing unit 206 is a circuit that receives the difference computing signal given by the difference computing unit 205 and linearly increases the difference computing signal up to a reference density value (reference density). Note that FIG. 5A shows an example of a slant line given to increase the density value. Adjusting the intercept and slope of the slant line allows to change the brightness and the contrast enhancement level of the composited image given by the composited image signal 207a. For example, to raise the contrast enhancement level, the intercept is made small, and the slope of the slant line is made large, as shown in FIG. 5B.

A compositing processing unit 207 receives the input image signal and the normalized signal given by the normalization processing unit 206 and, based on the density value of the input image signal and that of the normalized signal, computes $$R=(2^q-1)-2\times((2^q-1)-BG)\times((2^q-1)-FG)/2^q \text{ (when } FG \geq 2^{q-1})$$

$$R=2\times BG \times FG/2^q \text{ (when } FG<2^{q-1}) \quad (1)$$

R: computing result
BG: input image signal
FG: normalized signal
q: number of bits of image In this embodiment, the image data input to the compositing processing unit is 8-bit data. Hence, the compositing processing unit 207 computes based on $$R=255-2\times(255-BG)\times(255-FG)/256 \text{ (when } FG \geq 128)$$

$$R=2\times BG \times FG/256 \text{ (when } FG<128) \quad (2)$$

R: computing result
BG: input image signal
FG: normalized signal
and outputs a painting-like composited image signal.

Figure 6A:
FIGS. 6A and 6B are photos showing an input image and an image converted to a painting-like image.
Figure 6B:
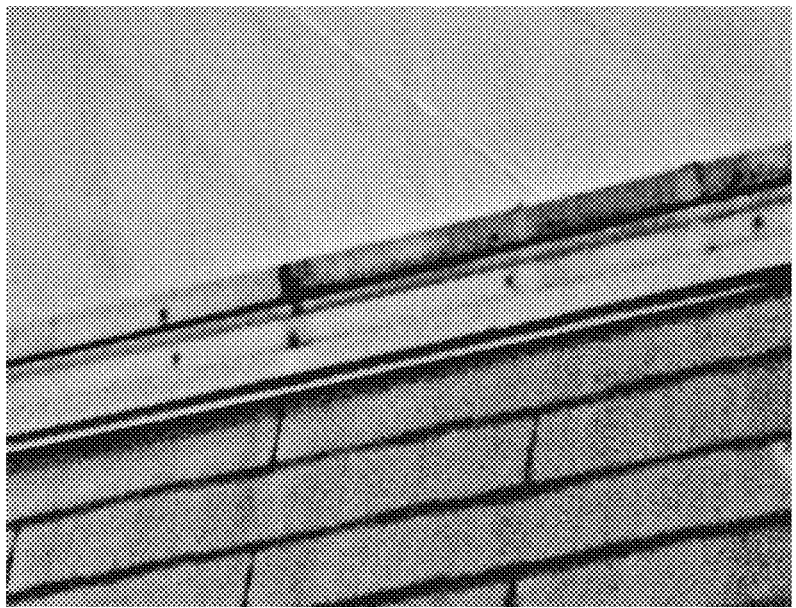

Note that as an example of the painting-like image effect, FIG. 6A shows an image input to the blurred image generation unit 203 as the input image 200, and FIG. 6B shows an image converted to the painting-like image, which corresponds to the original image and is obtained from the compositing processing unit 207. The edge portions are enhanced as compared to the image before processing. In addition, a halo is generated, and the texture of flat portions is improved. Hence, a painting-like atmosphere comes across, as is apparent.

FIG. 7 is a flowchart showing the operation of the image capture apparatus including painting-like processing according to this embodiment. Note that each step is performed by the CPU 103 or by a unit based on an instruction issued by the CPU 103.

In step S701, the CPU 103 obtains shooting settings such as the shooting mode, exposure, and white balance. The subsequent processing is performed based on the obtained shooting settings. In step S702, the image sensor 102 performs shooting processing and obtains image data. In step S703, general image processing is performed, including white balance processing by the white balance unit 1101, development processing by the development processing unit 1102, and gamma conversion processing by the gamma conversion unit. The processed image data that has undergone processing up to the gamma conversion processing is input to the painting-like processing unit. In step S704, the above-described painting-like processing is performed. The processed image undergoes processing such as compression and is stored in the primary storage device 104 (step S705). The processing thus ends.

As described above, in this embodiment, the blurred image is signal-adjusted. The difference from the original image is calculated to obtain the difference image that still contains low-frequency components. The difference image is composited with the original image, thereby obtaining a composited image that maintains the texture of flat portions.

In addition, adjusting the degree of blur of the blurred image allows the adjustment of the degree of edge enhancement and the thickness of the halo around the edges.

Adjusting the adjustment curve of signal adjustment processing performed for the blurred image allows the adjustment of the contrast of the composited image or the texture of flat portions.

In this embodiment, since the above-described adjustment of the degree of blur or the adjustment curve can be determined in accordance with the shooting mode, the user can easily obtain an appropriate image in accordance with the shooting mode.

(Second Embodiment)

Figure 8:
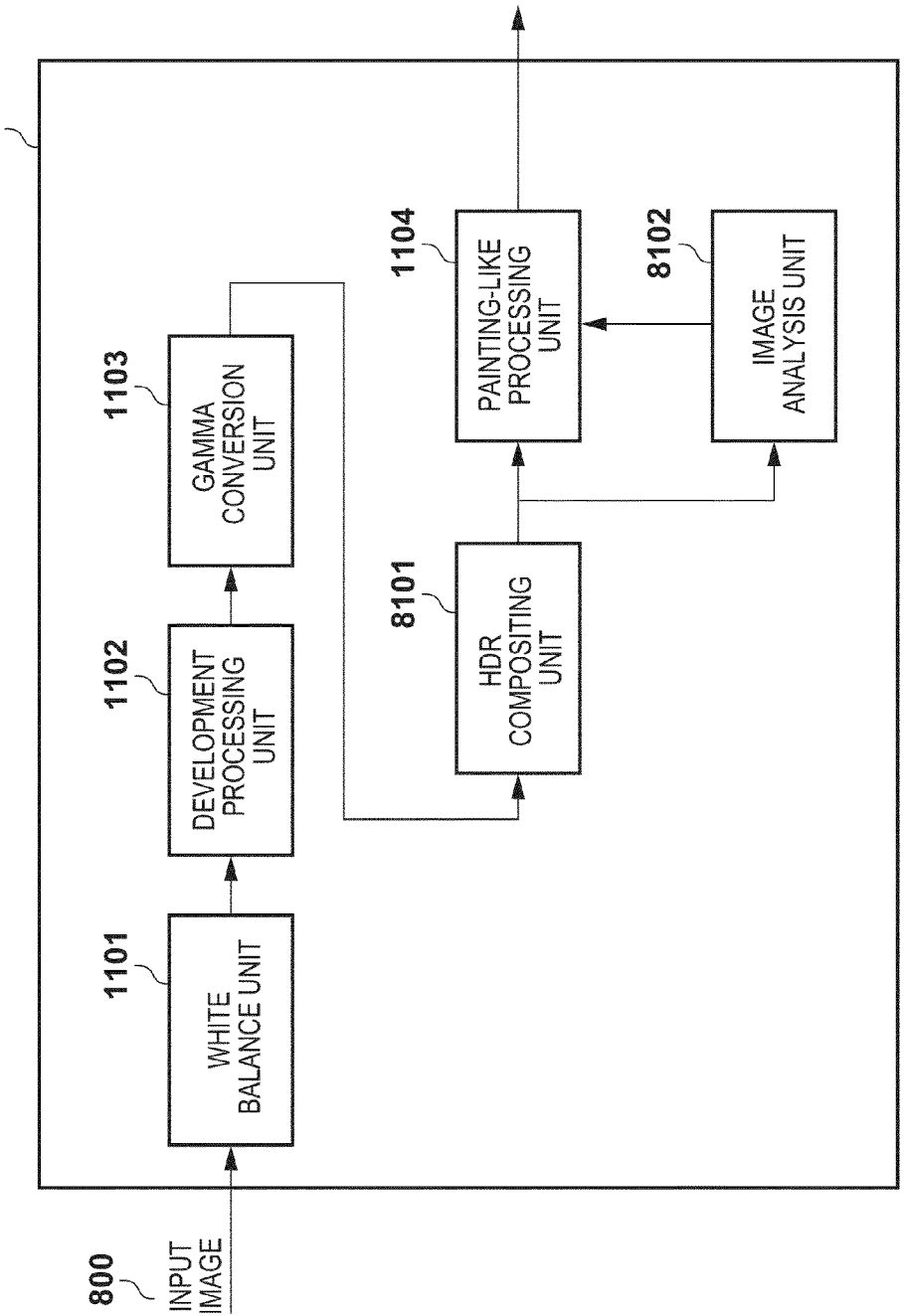
FIG. 8 is a block diagram showing an example of the arrangement of a painting-like processing unit according to the second embodiment.

FIG. 8 is a block diagram showing an example of the arrangement of an image processing apparatus according to the second embodiment used to convert an original image into a painting-like image. An image processing apparatus 810 additionally includes an HDR compositing unit 8101 and an image analysis unit 8102, unlike the first embodiment. The rest is the same as in the first embodiment, and the same reference numerals denote the same parts.

In this embodiment, to obtain an image with a wider dynamic range, an image capture apparatus 100 performs shooting a plurality of times while changing the exposure. A plurality of shot image data under different exposures obtained by the shooting are stored in a primary storage device 104. The HDR compositing unit 8101 is a circuit that composites the plurality of shot image data stored in the primary storage device 104 for each pixel based on a predetermined compositing ratio.

The compositing ratio is set in accordance with the level of the brightness value of each pixel of each of the plurality of shot image data except arbitrary image data relative to a reference brightness value that is the brightness value of the arbitrary image data. For example, assume that three images are shot: an image obtained by long-time exposure, an image obtained by medium-time exposure, and an image obtained by short-time exposure. In this case, a first threshold at which switching occurs between the image obtained by long-time exposure and the image obtained by medium-time exposure and a second threshold at which switching occurs between the image obtained by medium-time exposure and the image obtained by short-time exposure are provided. For a pixel of the image obtained by medium-time exposure, which has a brightness value lower than the above-described first threshold, a pixel of the image obtained by long-time exposure is employed. For a pixel having a brightness value higher than the above-described second threshold, a pixel of the image obtained by short-time exposure is employed, thereby performing compositing.

Figure 10:
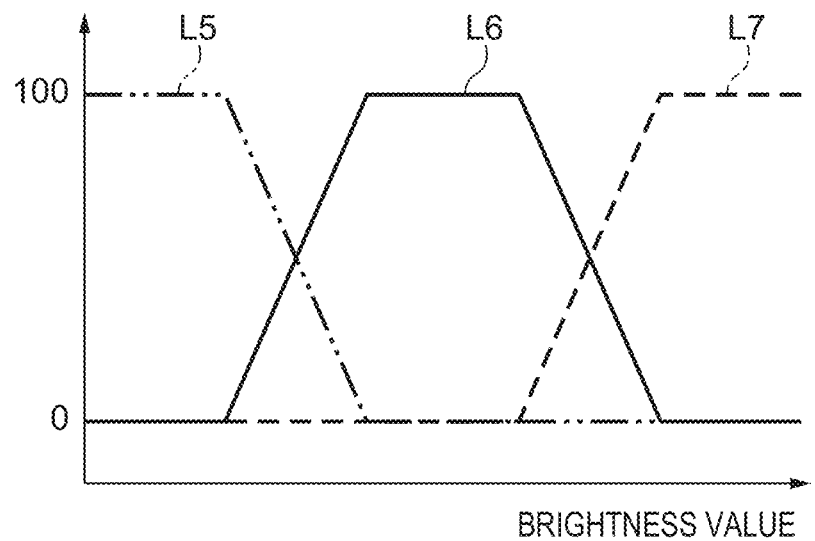
FIG. 10 is a graph showing an example of a compositing ratio table.

To make the composited image look as seamless as possible, the interpolation function may be changed by, for example, using a linear interpolation function. For example, when the compositing ratio is linearly increased or decreased, as shown in FIG. 10, the seams can be reduced.

Compositing the above-described plurality of shot image data enables to obtain an input image 800 having a wide dynamic range but less blown-out highlights and blocked-up shadows, and a more excellent effect of painting-like image conversion can be expected.

The image analysis unit 8102 is a circuit that analyzes and determines whether the image compositing signal given by the HDR compositing unit 8101 includes a person, a vehicle, or the like. As an analysis method used when the image includes a person, for example, the gradient direction of an arbitrary region in the image signal given by the image data is regarded as an edge intensity to calculate it as a feature amount. If the correlation coefficient between the feature amount and that of a sample accumulated in a database is high, it is determined that the above-described image data includes a person. Note that the present invention is not limited to the above-described analysis method, and various changes and modifications can be made within the spirit and scope of the present invention, as a matter of course.

An external control signal cont201 is adjusted in accordance with the determination result analyzed by the image analysis unit 8102. When the image analysis unit 8102 determines that a person is detected, to add a thick halo around the person, the reduction ratio and the enlargement ratio are raised by the external control signal cont201 to increase the degree of blur.

An external control signal cont202 is also adjusted in accordance with the determination result analyzed by the image analysis unit 8102, like the above-described external control signal cont201. In this embodiment, when the image analysis unit 8102 determines that a building is detected, the contrast enhancement level should be raised to generate gradation. Hence, the curvature of the conversion curve convex downward is increased by the external control signal cont202.

Figure 9:
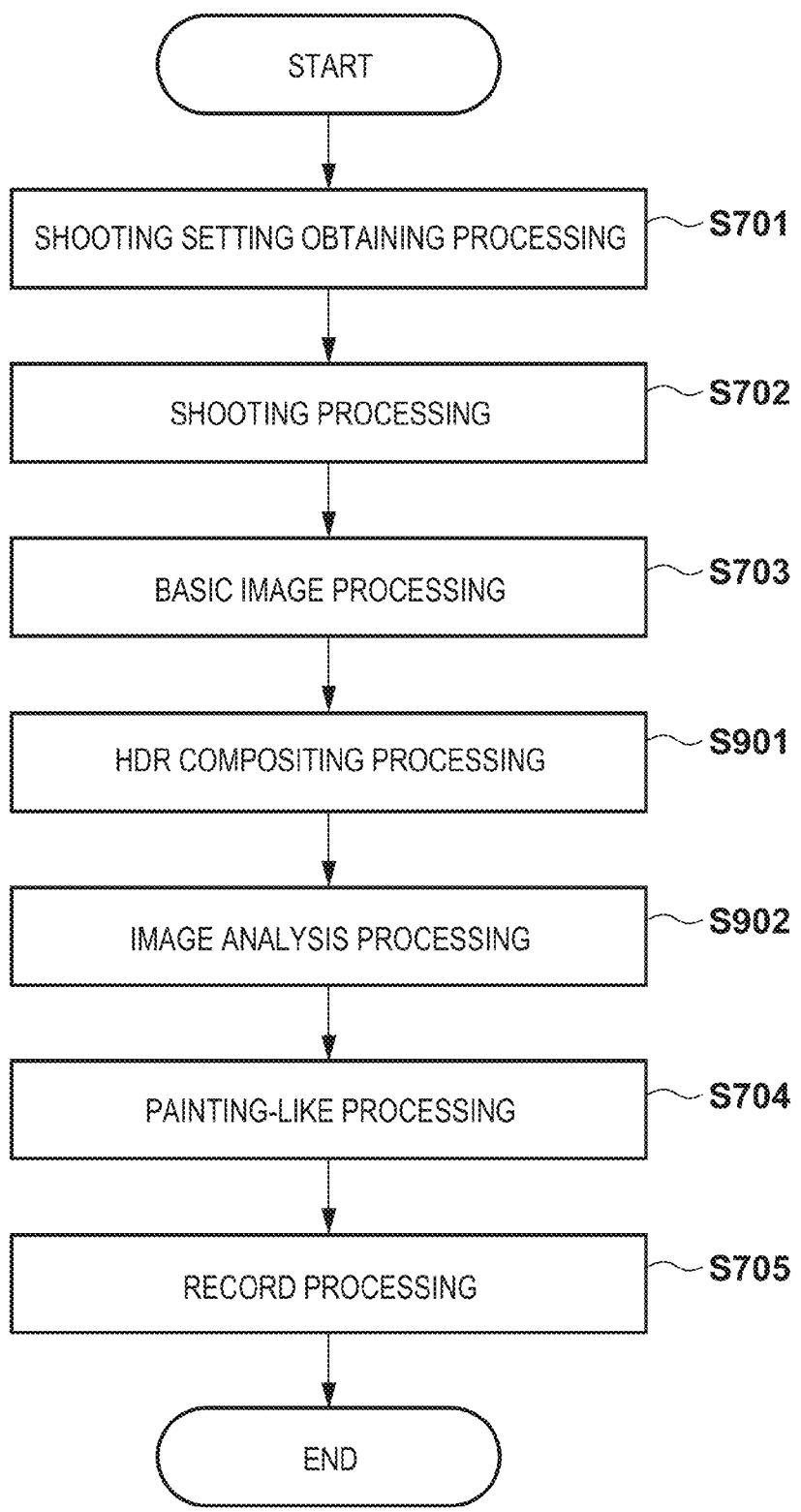
FIG. 9 is a flowchart showing the operation of an image capture apparatus according to the second embodiment.

FIG. 9 is a flowchart showing the operation of the image capture apparatus including painting-like processing according to this embodiment. Note that each step is performed by a CPU 103 or by a unit based on an instruction issued by the CPU 103.

In the second embodiment, a plurality of image data processed up to step S703 are stored in the primary storage device 104. In step S901, the above-described HDR compositing processing is performed using these images. In step S902, the above-described image analysis processing is performed for the image after the HDR compositing processing. In step S704, painting-like processing is performed using the image analysis result, as described above.

The rest of the arrangement is the same as in the first embodiment, and the same reference numerals denote the same parts. The subsequent implementation method is the same as in the first embodiment, and a description thereof will be omitted.

As described above, in this embodiment, the blurred image is signal-adjusted. The difference from the original image is calculated to obtain the difference image that still contains low-frequency components. The difference image is composited with the original image, thereby obtaining a composited image that maintains the texture of flat portions.

In addition, adjusting the degree of blur of the blurred image allows adjustment of the degree of edge enhancement and the thickness of the halo around the edges.

Adjusting the adjustment curve of signal adjustment processing performed for the blurred image allows adjustment of the contrast of the composited image or the texture of flat portions.

In this embodiment, since the above-described adjustment of the degree of blur or the adjustment curve can be determined in accordance with the image by image analysis, the user can easily obtain an image that has appropriately undergone painting-like processing in accordance with the image.

(Third Embodiment)

The third embodiment of the present invention will be described next. This embodiment is directed to a suitable method of converting an HDR (High Dynamic Range) image that is an example of an image having a low contrast into a painting-like image, and more specifically, to a method of generating an HDR image (composited image) suitable for painting-like conversion.

As a method of apparently expanding the dynamic range of an image sensor, the HDR image is obtained by compositing a plurality of images of a single scene under difference exposures. The thus obtained composited image has tones in portions used to be blocked-up shadows or blown-out highlights and is therefore actually a low-contrast image.

FIG. 11 shows the internal arrangement of an image processing apparatus 110 according to this embodiment. The same reference numeral as in FIG. 1B denote the same parts in FIG. 11, and a description thereof will be omitted. A brightness correction unit 1105 applies brightness correction processing to an input image for each area unique to this embodiment as will be described later. A development processing unit 1102 performs so-called development processing such as matrix conversion processing or interpolation processing of interpolating a color mosaic image so as to generate a color image in which every pixel has R, G, and B color information. Image data after gamma conversion is stored in a primary storage device 104. An HDR compositing unit 1106 performs compositing processing of expanding the apparent dynamic range for a plurality of image data captured under different exposures. A painting-like processing unit 1104 performs painting-like processing for the composited image and outputs it.

Figure 13A:
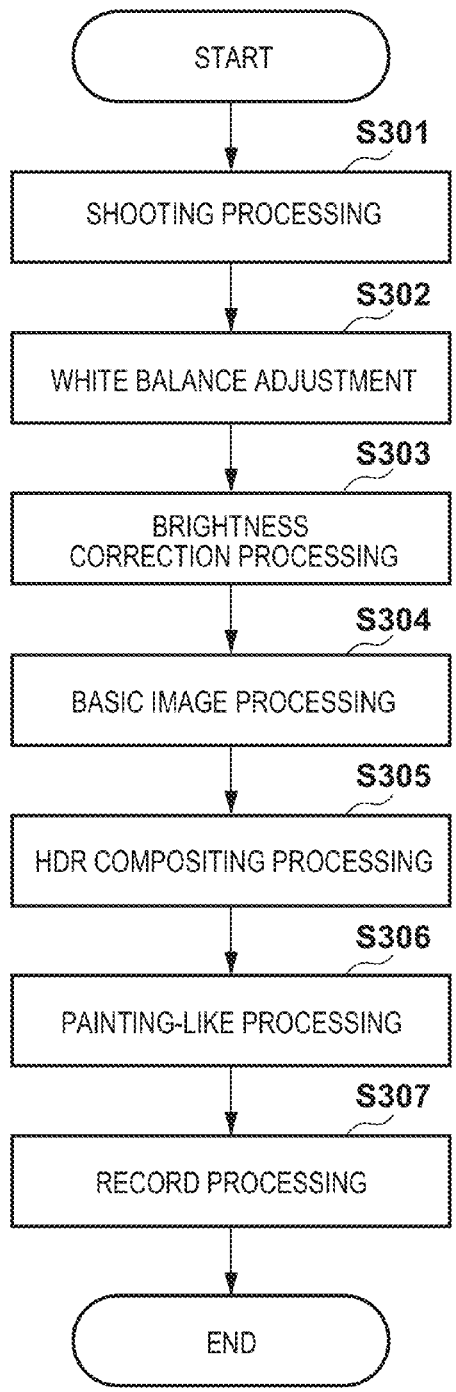
FIG. 13A is a flowchart showing the procedure of image processing according to the third embodiment of the present invention.
Figure 13B:
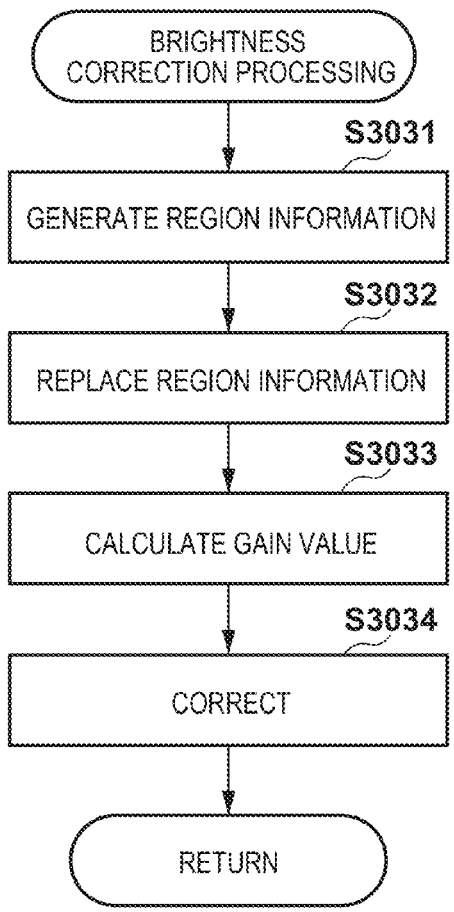
FIG. 13B is a flowchart showing the procedure of brightness correction processing according to the third embodiment.

FIG. 12 is a block diagram showing the internal arrangement of the brightness correction unit 1105. FIGS. 13A and 13B are flowcharts showing the procedure of image processing according to this embodiment. Image processing according to this embodiment will be described below with reference to FIGS. 1A, 11, 12, 13A, and 13B.

In step S301, a CPU 103 causes an image sensor 102 to continuously execute shooting a plurality of times for a single visual field under different exposures in accordance with the procedure of so-called bracket shooting. Note that the following description will be made assuming that the shot images concerning the compositing processing have the same visual field so as to facilitate the description and understanding of the compositing processing. However, widening the dynamic range by image compositing is not limited to use of a plurality of images having the same visual field as a whole. It is necessary only that at least part of the visual field to be shot is common to all image to be continuously shot. In this specification, "shot image" means "region corresponding to the visual field common to a plurality of images", and does not always means an entire image. The technique of extracting the common visual field portions out of a plurality of images and compositing them is already known, and is not directly relevant to the present invention, a description of details will be omitted.

Note that a known technique is usable for processing of obtaining correct exposure or bracket shooting, and a description of details will be omitted. The degree of underexposure or overexposure relative to the correct exposure and the number of images to be shot are predetermined. Both images of underexposure and overexposure are not always necessary in addition to images shot under correct exposure, and at least one of them suffices. Images may be shot under underexposure and overexposure relative to the correct exposure and used without performing shooting under correct exposure. Every time an image concerning the compositing is shot, the CPU 103 sequentially stores the image data in the primary storage device 104.

In step S302, the CPU 103 causes a white balance unit 1101 to perform white balance adjustment for the plurality of image data stored in the primary storage device 104 in step S301. In this embodiment, a correct exposure image is shot first, and the white balance coefficient of the correct exposure image is applied to the remaining exposure images. This prevents the image generated by compositing images of different white balances from having an unnatural tint. However, the white balance coefficient may be obtained in every shooting and applied, as a matter of course. Note that not the images stored in the primary storage device 104 but images stored in a storage medium 106 may be read out and processed.

In step S303, the CPU 103 causes the brightness correction unit 1105 to perform brightness correction processing as the characteristic feature of this embodiment.

Figures 14A, 14B:
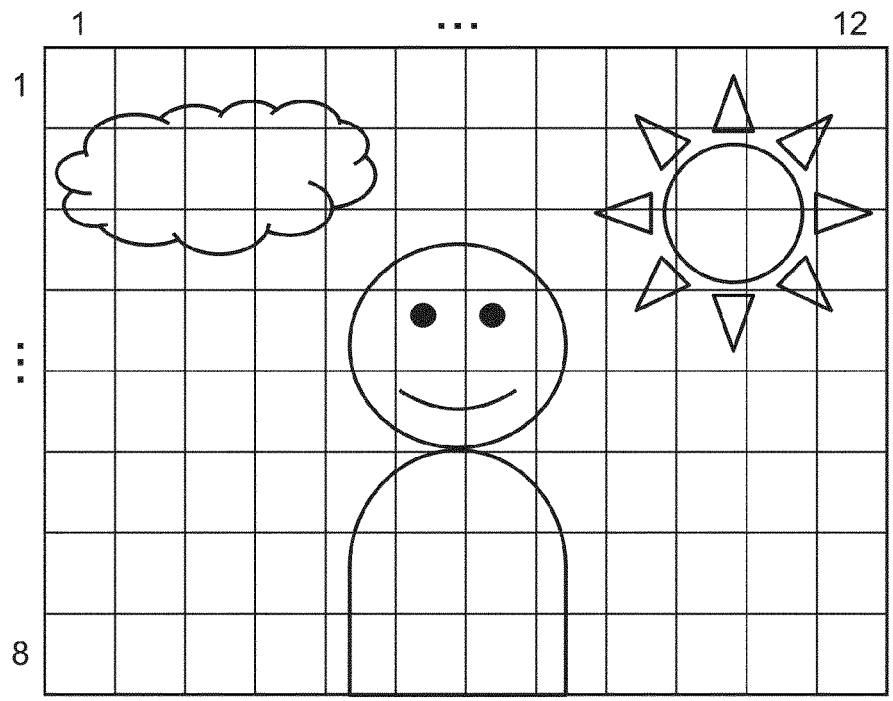
FIG. 14A is a view showing an example of region division in the brightness correction processing according to the third embodiment of the present invention.
FIG. 14B is a view showing an example of the representative brightness value of each region.

Details of the processing in step S303 will be described with reference to the flowchart of FIG. 13B. In step S3031, the CPU 103 causes a region information generation unit 1201 to divide the white-balance-adjusted image into regions. The region information generation unit 1201 performs region division in accordance with division information given by the CPU 103. FIG. 14A shows an example in which an image is equally divided into 12 regions in the horizontal directions and 8 regions in the vertical direction. Although division to rectangular regions is performed in this embodiment, the image can be divided into regions of an arbitrary shape such as a polygonal shape including triangular and hexagonal shapes.

Next, the CPU 103 obtains, for each divided region, the average value of the brightness values of all pixels included in the region as the representative brightness value of the region. FIG. 14B show an example of the representative brightness value of each region corresponding to FIG. 14A. In this embodiment, the average value of brightness values is used as the representative value of each region. However, the average value of R, G, or B values of the pixels after demosaicing (color interpolation processing) may be obtained as the representative value of the region.

In step S3032, the CPU 103 causes a region information replacement unit 1202 to replace the representative brightness value of each region obtained in step S3031 with a gain value. The region information replacement unit 1202 can replace the representative brightness value with the gain value by looking up a lookup table representing the relationship between the representative brightness values and the gain values, which is stored in, for example, a secondary storage device 105 in advance.

In this embodiment, for an image shot under underexposure, if the representative brightness value is smaller than a predetermined reference value a, the representative brightness value is replaced with a gain value (larger than 1) which changes the representative brightness value to a predetermined brightness value. For an image shot under overexposure, if the representative brightness value is larger than a reference value b, the representative brightness value is replaced with a gain value (smaller than 1) which changes the representative brightness value to a predetermined brightness value.

Figure 15A:
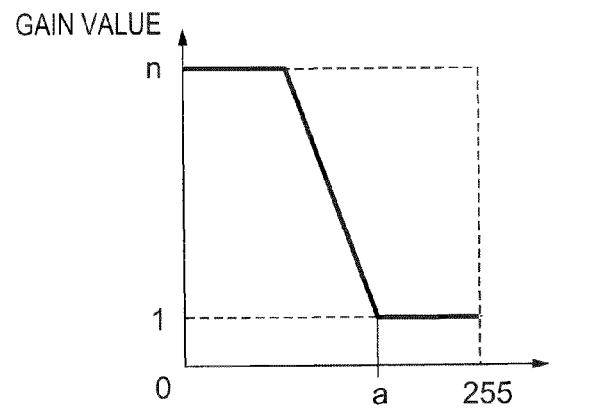
FIG. 15A is a graph showing the characteristic of a lookup table applied to an image shot under underexposure.
Figure 15B:
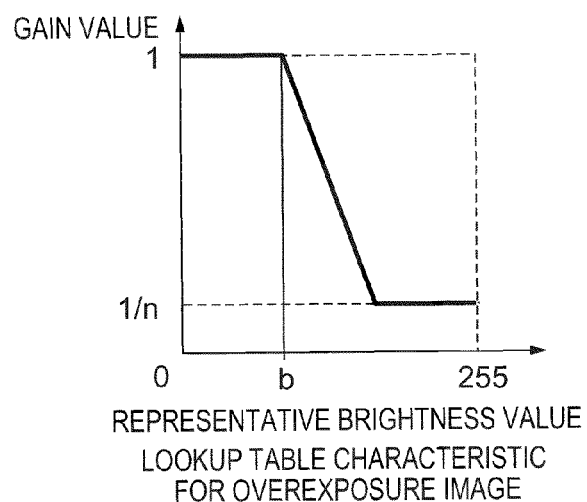
FIG. 15B is a graph showing the characteristic of a lookup table applied to an image shot under overexposure.
Figure 15C:
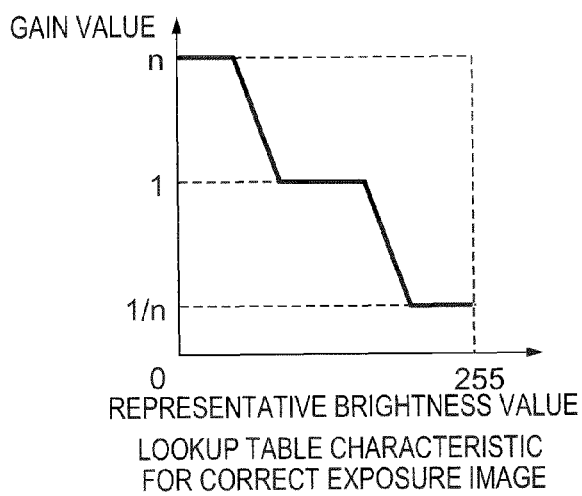
FIG. 15C is a graph showing the characteristic of a lookup table applied to an image shot under correct exposure.

FIGS. 15A and 15B show the characteristics of lookup tables applied to an image shot under underexposure and an image shot under overexposure, respectively. The value a in FIG. 15A and the value b in FIG. 15B correspond to the above-described reference values. FIG. 15C shows the characteristic of a lookup table applied to an image shot under correct exposure.

Adjusting the characteristic of the lookup table enables to change the intensity of a halo generated in an image output from a brightness correction unit 1204. For example, to strengthen the halo, the difference between a gain corresponding to a region having a small average brightness value and a gain corresponding to a region having a large average brightness value is made large in the characteristic of the lookup table to be applied to the image shot under underexposure relative to correct exposure. In this case, although the image after brightness correction is not equivalent to the image of correct exposure, this is not particularly problematic because conversion of a painting-like image is done while placing importance not on the correctness of exposure but on the degree of the special effect.

Note that for example, if the shooting is performed a plurality of times under underexposure/overexposure, like a step of ±2/3 and ±4/3 relative to correct exposure, the lookup tables may be prepared in accordance with the respective exposure settings.

Figure 16A:
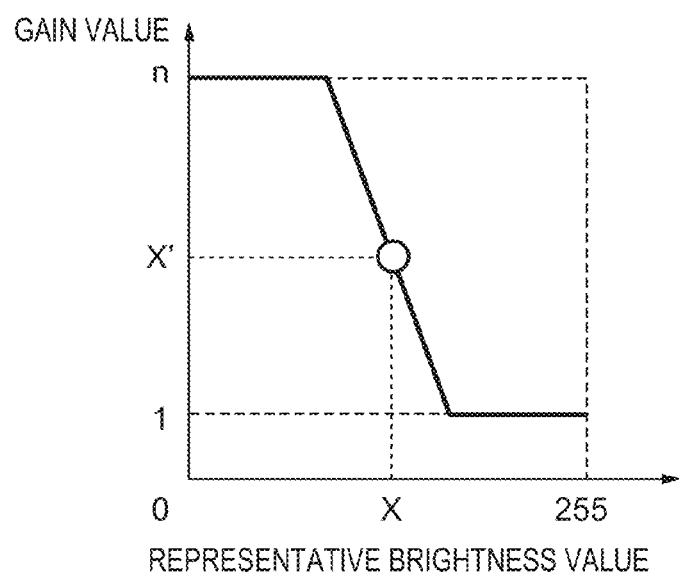
FIG. 16A is a graph schematically showing an operation of obtaining a gain value from a representative brightness value using a lookup table.
Figure 16B:
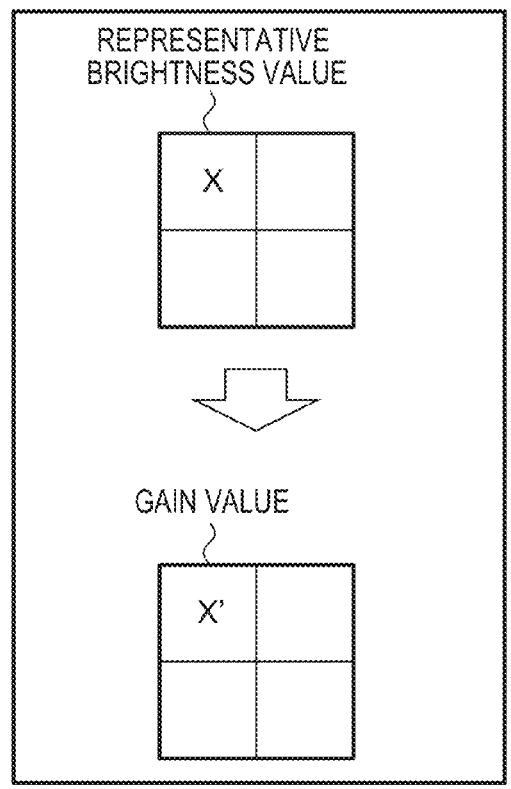
FIG. 16B is a view schematically showing an operation of replacing a representative brightness value with a gain value in each region.

FIG. 16A is a graph schematically showing an operation of obtaining a gain value from a representative brightness value using a lookup table. FIG. 16B is a view schematically showing an operation of replacing a representative brightness value with a gain value in each region. From the characteristic curve shown in FIG. 16A, the gain value for a region where the representative brightness value is X is defined as X' for an underexposure image. Then, the gain value of each pixel in the next region is calculated by setting the gain value corresponding to the region where the representative brightness value is X is X', as shown in FIG. 16B.

Referring back to FIG. 13B, in step S3033, the CPU 103 causes a gain value calculation unit 1203 to calculate the gain value of each pixel by inputting the gain value of each region obtained in step S3032.

For example, the gain of each pixel is calculated in accordance with the following principle. First, the distance from the pixel (pixel of interest) whose gain is to be calculated to the center or the center of gravity of each of a plurality of regions near the region including the pixel of interest is obtained. Four regions are selected in ascending order of distance. Two-dimensional linear interpolation is performed for the gain values of the four selected regions such that the weight becomes large as the distance between the pixel of interest and the center/center of gravity of the region becomes short, thereby calculating the gain value of each pixel. Note that the method of calculating the gain value of each pixel based on the gain value of each region is not limited, and any other method is usable, as a matter of course. The CPU 103 itself may calculate the gain value of each pixel as software.

Assume that the original image is has 3000×2000 pixels and is divided into square blocks each including 250×250 pixels in the vertical and horizontal directions. At this time, the image (image formed from representative brightness values) output from the region information generation unit 1201 has 12×8 pixels. The region information replacement unit 1202 replaces the value (representative brightness value) of each pixel of the image with a gain value. The image is enlarged to the number of pixels of the original image by linear interpolation, the value of each pixel after the enlargement is the gain value of the corresponding pixel of the original image.

In step S3034, the CPU 103 causes the brightness correction unit 1204 to apply the gain value of each pixel obtained in step S3033 to the image data white-balance-adjusted and stored in the primary storage device 104, thereby performing brightness correction for each pixel. The CPU 103 stores the image data after the brightness correction in the primary storage device 104.

Brightness correction by the brightness correction unit 1204 is implemented by $$R\text{out}=\text{Gain}\times R\text{in} \quad (1)$$

$$G\text{out}=\text{Gain}\times G\text{in} \quad (2)$$

$$B\text{out}=\text{Gain}\times B\text{in} \quad (3)$$

where
Rout: red pixel value after brightness correction
Gout: green pixel value after brightness correction
Bout: blue pixel value after brightness correction
Rin: red pixel value after white balance adjustment
Gin: green pixel value after white balance adjustment
Bin: blue pixel value after white balance adjustment
Gain: gain value of each pixel The processing in step S303 is assumed to be applied to data before demosaicing (color interpolation processing). However, this processing may be applied to data (each pixel has RGB or YUV component values) after demosaicing.

Referring back to the flowchart of FIG. 13A, in step S304, the CPU 103 causes a development processing unit 1102 and a gamma conversion unit 1103 to apply the above-described basic image processing such as development processing and gamma conversion processing to each image data output from the brightness correction unit 1105.

In step S305, the CPU 103 causes the HDR compositing unit 1106 to receive the image brightness-corrected in step S303 and the reference image stored in the primary storage device 104 without brightness correction in step S303 and composite the images for each pixel based on a predetermined compositing ratio, thereby obtaining a composited image.

In this embodiment, when generating a composited image, shooting is performed three times in the order of correct exposure, underexposure, and overexposure in step S301.

After the shooting, a total of four images, that is, the images brightness-corrected by the brightness correction unit 1105 and the development, and an image shot under correct exposure and developed after white balance adjustment without brightness correction by the brightness correction unit 1105, are input to the HDR compositing unit 1106. The correct exposure image developed after white balance adjustment without brightness correction by the brightness correction unit 1105 is used as the reference image for compositing.

Figure 17:
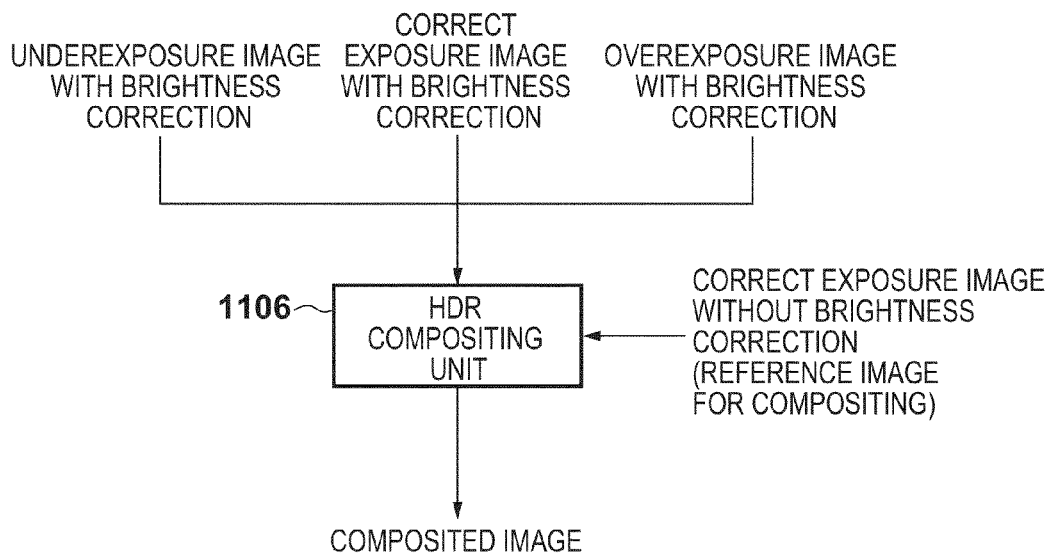
FIG. 17 is a view schematically showing an example of input/output data of an HDR compositing unit 1106 according to the third embodiment of the present invention.

FIG. 17 schematically shows an example of input/output data of the HDR compositing unit 1106.

The compositing ratio of the three images to be composited after the brightness correction is determined in accordance with the level of the brightness value of each image relative to the brightness value of each pixel of the reference image. The reference image is used to only determine the compositing ratio and is not included in the composited image.

For example, assume that three images, that is, an overexposure image, a correct exposure image, and an underexposure image are shot. In this embodiment, the correct exposure image that is not brightness-corrected serves as the reference image. In this case, a first threshold at which switching occurs between the overexposure image and the correct exposure image and a second threshold at which switching occurs between the correct exposure image and the underexposure image are provided. Hence, first threshold<second threshold.

A pixel for which the brightness value of the reference image is lower than the first threshold: the pixel value of the overexposure image, a pixel for which the brightness value of the reference image is equal to or higher than the first threshold and equal to or lower than the second threshold: the pixel value of the correct exposure image, and a pixel for which the brightness value of the reference image is higher than the second threshold: the pixel value of the underexposure image are employed and composited.

If the pixel values are simply selected and composited (that is, the compositing ratio is 0% or 100%), the borders (pseudo contours) between pixels employed from different images may visually be recognized in the composited image. For example, when the compositing ratio is linearly increased/decreased, as shown in FIG. 18, the generation of borders can be reduced.

Figure 18:
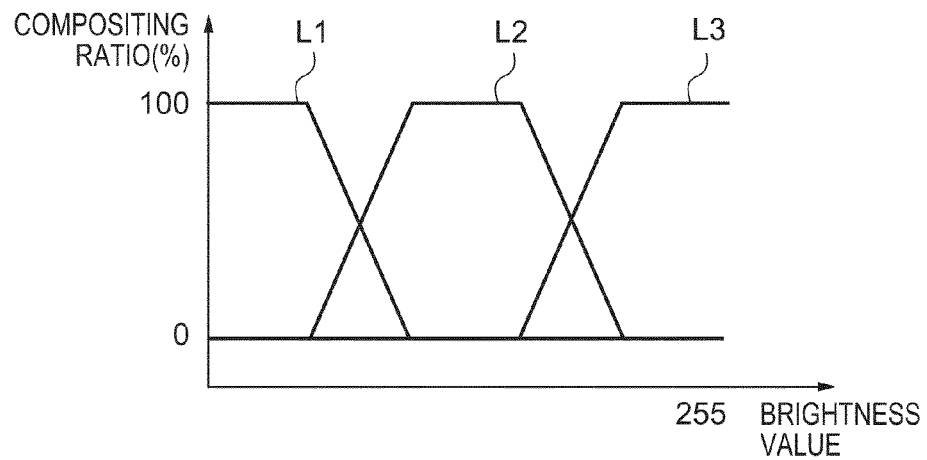
FIG. 18 is a graph showing an example of a compositing ratio according to the third embodiment of the present invention.

In this embodiment, the correct exposure image without brightness correction by the brightness correction unit 1105 is used as the reference image in each image processing, and compositing is done based on the compositing ratio as shown in FIG. 18. However, image compositing may be performed in a state before the respective pixels obtain the necessary components (for example, RGB components or YUV components), for example, before demosaicing. In this case, the reference image is also input to the HDR compositing unit 1106 in the state after white balance adjustment in the same format as that of each image to be composited and before development processing. The HDR compositing unit 1106 compares the brightness values using the reference image.

In step S306, the CPU 103 causes the painting-like processing unit 1104 to perform painting-like processing to be described later for the input image data after the HDR compositing processing. The processed image undergoes processing such as compression and is stored in the primary storage device 104 (step S307). The processing thus ends. The processing of the painting-like processing unit 1104 can be the same as in the first or second embodiment.

In this embodiment, a difference image in which low-frequency components remain is obtained by calculating difference between a signal-adjusted image of a blurred image of an HDR image and the original image. By compositing such a difference image with the original image, a composited image in which the texture of flat portions remains can be obtained.

With the above-described processing, a painting-like HDR image including a halo around the edge portions can be obtained.

Figure 19A:
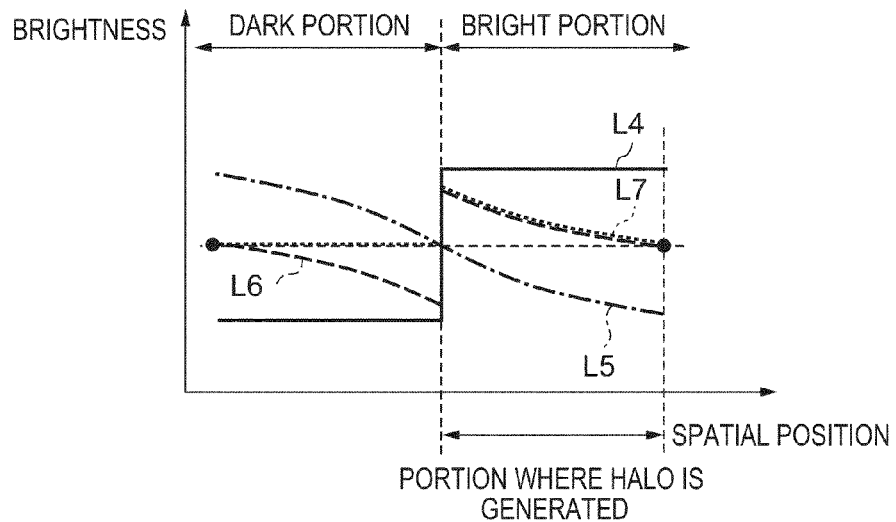
FIG. 19A is a graph for explaining the principle of halo generation.

Referring to FIG. 19A, L4 represents an example of the brightness and special position of an edge portion of the image after white balance adjustment before brightness correction obtained in step S302. L5 represents an example of the gain value of each pixel obtained in step S3033. FIG. 19A also shows an image L6 after brightness obtained in step S3034 and an example of the brightness and spatial position of an edge portion of a composited image L7 obtained in step S407.

As described above, the halo means white or black glory generated around an edge (the border between a bright portion and a dark portion) of an image. Referring to FIG. 19A, the brightness of a pixel line perpendicular to an arbitrary edge portion of an image obtained by performing white balance adjustment for the correct exposure image is represented by L4. Note that L4 indicates the state before brightness correction.

Figure 19B:
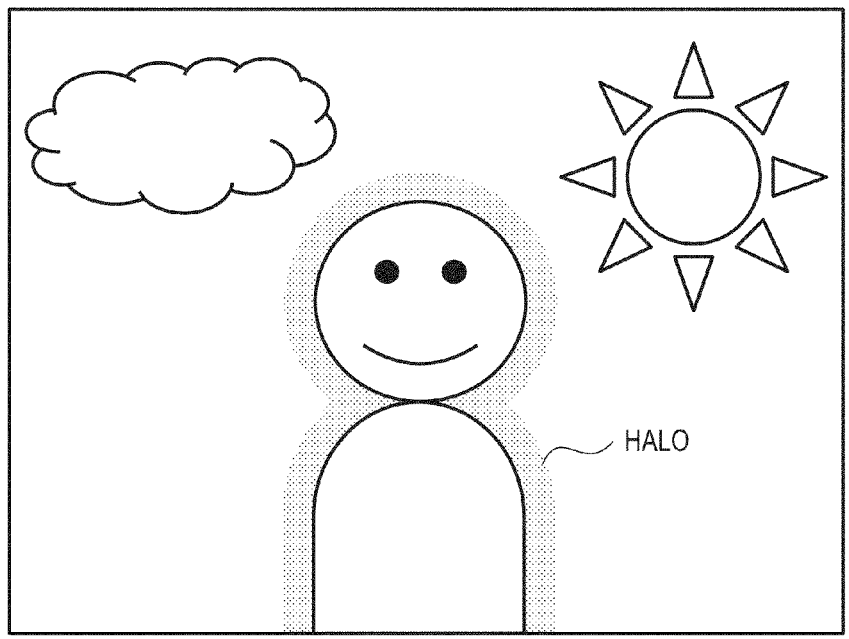
FIG. 19B is a view schematically showing an example of a halo with backlight.

For example, assume that FIG. 19A indicates a case in which a person is shot with backlight, and the dark portion of L4 corresponds to the person, and the bright portion corresponds to the background. In this case, assume that a gain value as indicated by L5 is employed to increase the brightness of the person to a predetermined value, and the image after brightness correction as indicated by L6 is obtained. When brightness correction for increasing the brightness of the person (dark portion) affects the region around the person, a bright portion is generated along the contour of the person. This bright portion is the white halo. FIG. 19B schematically shows the white halo generated around the person at the time of shooting with backlight. When compositing is performed in accordance with the compositing ratio shown in FIG. 18, the compositing result has a brightness distribution as indicated by L7.

Note that although the white halo is generated when the brightness of the bright portion adjacent to the dark portion is increased by processing of increasing the brightness of the dark portion, the black halo is generated when the brightness of the dark portion adjacent to the bright portion is decreased by processing of decreasing the brightness of the bright portion.

As described above, the halo is the phenomenon that occurs when the brightness correction processing is applied to a pixel that is adjacent to a pixel to apply the brightness correction and does not need brightness correction. For this reason, to intentionally generate the halo, the range of influence of brightness correction is adjusted. Additionally, the intensity of the halo can be controlled by adjusting the brightness correction value (gain value), as is understood.

As described above, in this embodiment, the gain value of brightness correction is determined for each divided region, and the gain value of each pixel is obtained from the gain value of the neighboring divided region. For this reason, even if pixels have the same brightness value, they use different gain values for brightness correction depending on the magnitude of the representative brightness value of the neighboring divided region. This is largely different from applying one gamma curve to the entire image, that is, all pixels, and determining the same gain value for pixels having the same brightness, as in the related art. Additionally, in the method of this embodiment, the gain value corresponding to a region can be determined in accordance with the representative brightness value of a neighboring region. For this reason, changing the characteristic of the lookup table allows to easily control the gain value for a high brightness region or a low brightness region important for halo generation.

In addition, since the gain value of brightness correction is determined for each divided region, and the gain value of each pixel is obtained from the gain value of a neighboring region, the range of influence of a certain gain value widens as the divided region becomes large. Hence, in this embodiment, the CPU 103 adjusts the size of the divided region based on the division information given to the region information generation unit 1201, thereby controlling the brightness correction contribution range and changing the range of the halo (the extent of halo generation from the edge portion).

For example, when the number of divided regions is increased to make the divided region size small, as shown in FIG. 20, the brightness correction contribution range narrows. Hence, the region where the halo is generated can be narrowed.

As described above, according to this embodiment, the processing target image is divided into predetermined value regions, and the gain for brightness correction is determined for each region, thereby giving the painting-like effect even to a low-contrast image such as an HDR image.

In addition, the size of the region where the halo is generated can be changed by adjusting the size of the divided region size. The intensity of the halo can be changed by adjusting the lookup table used to replacement of the brightness correction gain value for each region.

Note that the divided region size sufficient for obtaining a painting-like image and the characteristic of the lookup table can be experimentally obtained in advance. In addition, the user is allowed to dynamically change the strength of the effect while confirming the effect. If an instruction to strengthen the effect is received, one of making the divided region smaller and increasing the difference between the minimum gain and the maximum gain of the lookup table is performed. To weaken the effect, the adjustment is done reversely.

The painting-like processing unit 1104 can adjust the degree of edge enhancement or the size of the halo around the edges by adjusting the degree of blurring of the blurred image.

The contrast of the composited image or the texture of flat portions can be adjusted by changing the adjustment curve of signal adjustment processing for the blurred image.

In this embodiment, since the adjustment of the degree of blurring or the adjustment curve can be determined in accordance with the shooting mode, the user can easily obtain an appropriate image in accordance with the shooting mode.

(Fourth Embodiment)

The fourth embodiment of the present invention will be described next. The arrangement of an image capture apparatus serving as an image processing apparatus according to the fourth embodiment is the same as in the third embodiment except that the brightness correction unit 1105 is replaced with a brightness correction unit 1602. Note that the rest of the arrangement is the same as in the first or third embodiment and will be described using the same reference numerals as in FIG. 11. Only parts different from the first or third embodiment will be described below.

Figure 21:
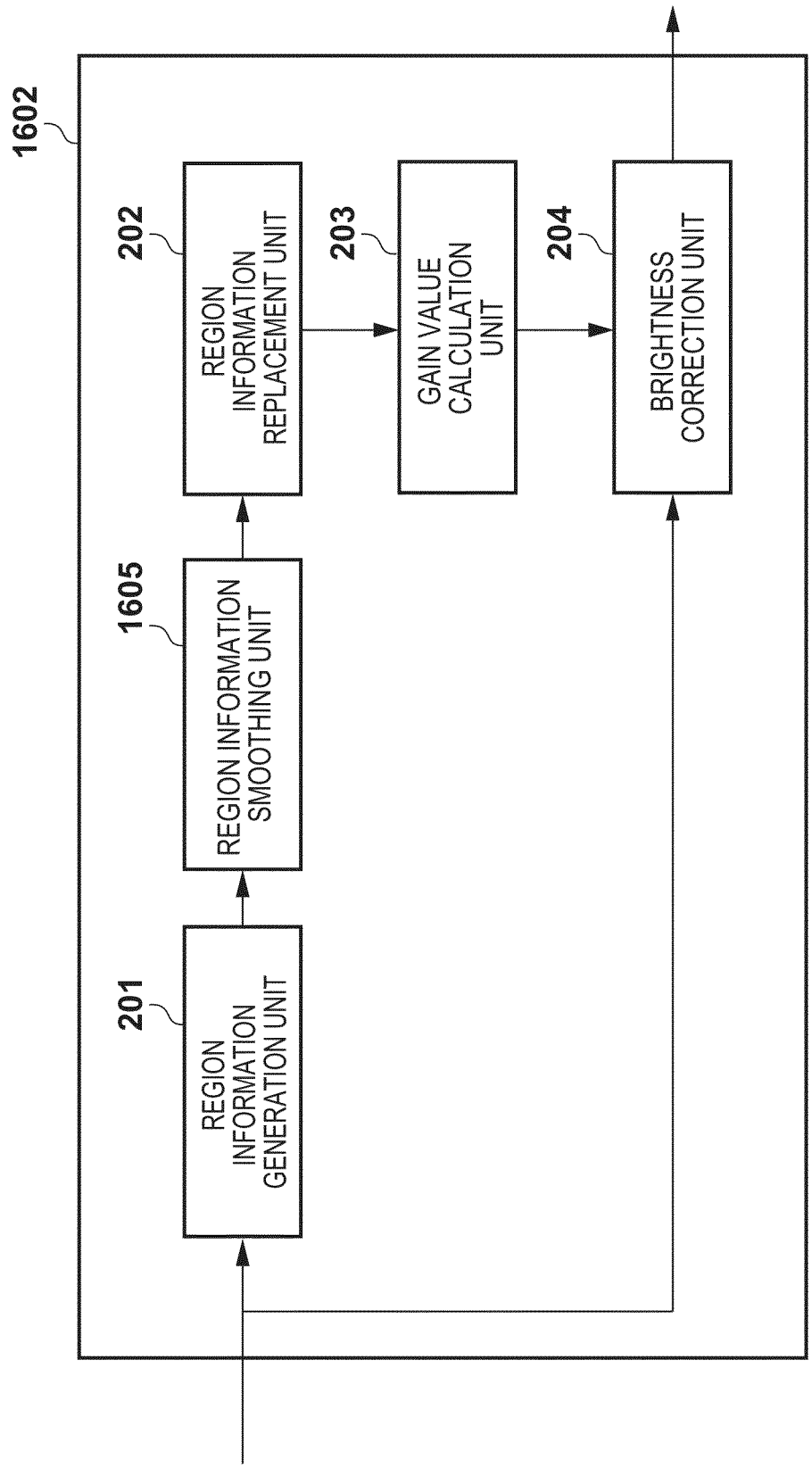
FIG. 21 is a block diagram of a brightness correction unit according to the fourth embodiment out of the image processing apparatus 110 included in the image capture apparatus 100 shown in FIG. 11.

FIG. 21 shows an example of the arrangement of the brightness correction unit 1602 in the image capture apparatus according to this embodiment. In the brightness correction unit 1602, a region information smoothing unit 1605 is provided between a region information generation unit 1201 and a region information replacement unit 1202 in addition to the constituent elements of the third embodiment. The rest of the arrangement is the same as in the third embodiment, and the same reference numerals as in FIG. 12 denote the same parts in FIG. 21.

Figures 22, 23:
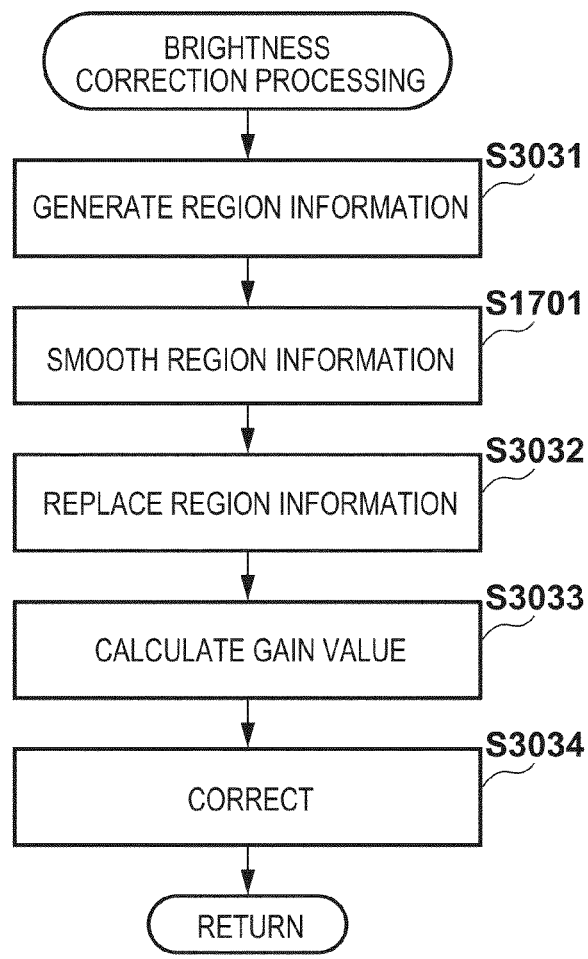
FIG. 22 is a flowchart showing the procedure of brightness correction processing according to the fourth embodiment of the present invention.
FIG. 23 is a view showing an example of a spatial filter usable by a region information smoothing unit according to the fourth embodiment of the present invention.

FIG. 22 is a flowchart of brightness correction processing according to this embodiment. This is the same as in the third embodiment except that region information smoothing processing of step S1701 is added to the flowchart of FIG. 13B.

In this embodiment, before the region information (representative brightness value) generated in step S3031 is replaced with the gain value of each region in step S3032, the region information smoothing unit 1605 smoothes the representative brightness value (average brightness value) of each region in step S1701. In this embodiment, a two-dimensional 5×5 spatial filter is applied to the average brightness value of each region, as shown in FIG. 23, thereby smoothing the average brightness value.

For example, when an image is divided into block-shaped regions, as shown in FIG. 14, the border portion between the divided regions may be noticeable in the output image data of a brightness correction unit 1204 at a portion where the difference in the average brightness value between adjacent regions is large. Hence, the average brightness value is smoothed to decrease the difference in the average brightness value between the adjacent regions, thereby making the border between the regions unnoticeable. Note that the average brightness value smoothing method is not particularly limited, and any other method is usable.

The subsequent processing is the same as in the third embodiment. As described above, according to this embodiment, in addition to the effect of the third embodiment, even when the difference in the average brightness value between adjacent regions is large, the border between the regions can be made unnoticeable in the image after brightness correction.

In the above-described third and fourth embodiments, the image shot under correct exposure in the state before brightness correction is used as the reference image used to calculate the compositing ratio. Using this reference image allows to widen the dynamic range and suppress an inappropriate tone change in the composited image. However, when generating an HDR image to which image processing of giving a special effect is applied, as in the present invention, the reference image need not always be prepared separately from the images to be composited. That is, one of the plurality of images to be composited can be used as the reference image.

(Fifth Embodiment)

The fifth embodiment of the present invention will be described next. This embodiment is directed to still another method of the above-described HDR image generation processing suitable for conversion to a painting-like image. However, the method of this embodiment can suitably be used even when conversion to a painting-like image is not performed and will therefore be described as a general HDR image generation method for the convenience. In this embodiment as well, the same reference numerals are used for the same contents as described above, and a description thereof will not be repeated.

As one method of obtaining a composited image with a wider dynamic range, one of a plurality of images to be composited is used as a reference image, and the remaining images are brightness-corrected based on the brightness value of the reference image and then composited. In this case, when the composited image is generated using an image whose brightness has been adjusted to widen the dynamic range as the reference image, the tone expression of the composited image may be inappropriate.

In this embodiment, the images after brightness correction are composited at the compositing ratio determined based on the images before brightness correction, thereby implementing generation of a composited image of appropriate tone expression.

Figure 24:
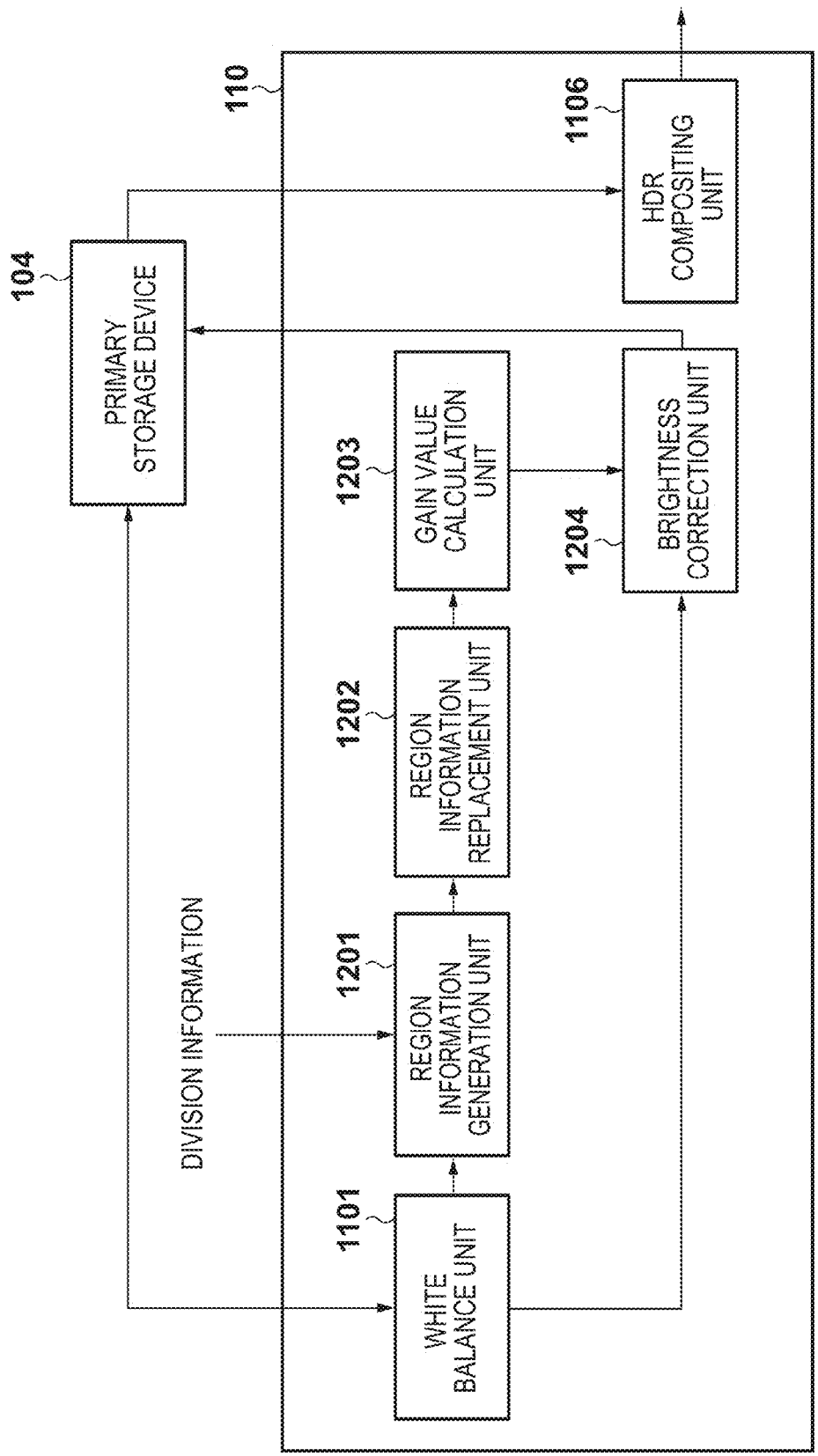
FIG. 24 is a block diagram of a function associated with generation of a composited image having a wider dynamic range out of an image processing apparatus 110 included in the image capture apparatus 100 shown in FIG. 1.

FIG. 24 is a block diagram of a function associated with generation of a composited image having a wider dynamic range out of an image processing apparatus 110 according to this embodiment.

The image processing apparatus 110 includes a white balance unit 1101, a region information generation unit 1201, a region information replacement unit 1202, a gain value calculation unit 1203, a brightness correction unit 1204, and an HDR compositing unit 1106.

Figure 25:
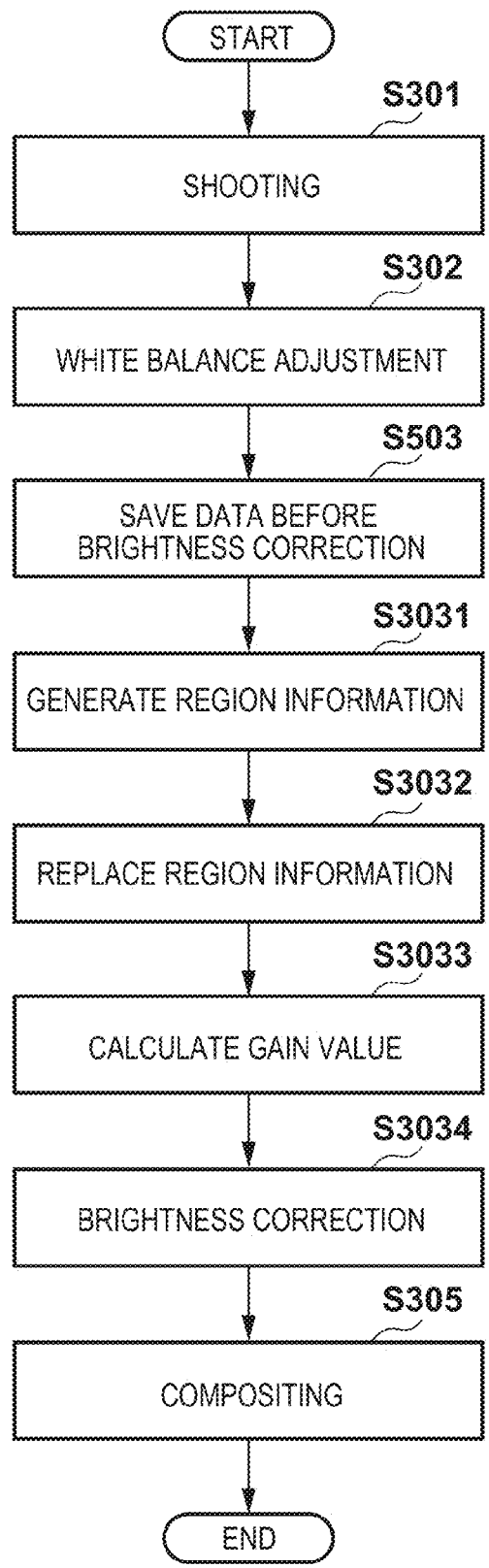
FIG. 25 is a flowchart showing the procedure of composited image generation processing according to the fifth embodiment of the present invention.

FIG. 25 is a flowchart showing the procedure of composited image generation processing according to this embodiment. The same step numbers as in FIGS. 13A and 13B represent the same processing steps in FIG. 25, and a description thereof will not be repeated. Only the steps of composited image generation processing characteristic to the embodiment will be explained below with reference to FIGS. 1, 13A, 13B, 24, and 25.

As is apparent from comparison between FIGS. 13A, 13B, and 25, the embodiment is including step S503 of saving data before brightness correction before the brightness correction processing after white balance adjustment.

In this embodiment, the image shot under correct exposure is indispensable, unlike the third embodiment. Except for this, at least one of an underexposure image and an overexposure image needs to exist.

In step S503, a CPU 103 stores, in a primary storage device 104, image data after white balance adjustment before brightness correction obtained in step S302. The image data stored here is used later in step S3031 or S305.

In step S3031, the CPU 103 causes the region information generation unit 1201 to divide the image after white balance adjustment before brightness correction, which is obtained in step S503, into regions. The region information generation unit 1201 performs region division as shown in, for example, FIG. 14A in accordance with division information given by the CPU 103. Although division to rectangular regions is performed in this embodiment, the image can be divided into regions of an arbitrary shape such as a polygonal shape including triangular and hexagonal shapes.

After that, the CPU 103 obtains, for each divided region, the average value of the brightness values of all pixels included in the region as the representative brightness value of the region (FIG. 14B) and causes the region information replacement unit 1202 to replace the representative brightness value of each region with a gain value (step S3032), as in the third embodiment.

The CPU 103 causes the gain value calculation unit 1203 to calculate the gain value of each pixel by inputting the gain value of each region obtained in step S3032 (step S3033).

In step S3034, the CPU 103 causes the brightness correction unit 1204 to apply the gain value of each pixel obtained in step S3033 to the image data white-balance-adjusted and stored in the primary storage device 104, thereby performing brightness correction for each pixel. The CPU 103 stores the image data after the brightness correction in the primary storage device 104.

In step S305, the CPU 103 causes the HDR compositing unit 1106 to receive the image brightness-corrected in step S3034 and the reference image (correct exposure image before brightness correction) stored in the primary storage device 104 in step S503 and composite the images for each pixel based on a predetermined compositing ratio, thereby obtaining a composited image (FIG. 17).

In this embodiment, when generating a composited image, shooting is performed three times under underexposure, correct exposure, and overexposure in step S301. Then, a total of four images, that is, the images obtained by performing brightness correction for the images obtained by shooting, and an image shot under correct exposure in the state after white balance adjustment (the state before brightness correction) are input to the HDR compositing unit 1106. The correct exposure image after white balance adjustment (without brightness correction) is used as the reference image for compositing.

Compositing can be performed as in the third embodiment. For example, when three images, that is, an overexposure image, a correct exposure image, and an underexposure image are shot, compositing is done based on a compositing ratio as shown in FIG. 18.

The difference between a composited image obtained using an image that is not brightness-corrected as the reference image and a composited image obtained using a brightness-corrected image as the reference image will be described here with reference to FIGS. 27A to 27C and 28B.

For example, assume that a person is shot indoors against a window with backlight. In an image (FIG. 27A) obtained by shooting the person under correct exposure, the person has an appropriate brightness. However, the outside scene having an object brightness higher than that of the person exhibit blown-out highlights. On the other hand, in an image (FIG. 27B) obtained by shooting the outdoor scene under correct exposure, the outdoor scene has an appropriate brightness. However, the person having an object brightness lower than that of the outdoor scene is buried in blocked-up shadows.

Assume compositing of the two images. The image shown in FIG. 27A obtained by shooting the person under correct exposure is assumed to be the correct exposure image, for the descriptive convenience. Hence, the image shown in FIG. 27B is the underexposure image.

Figure 27A:
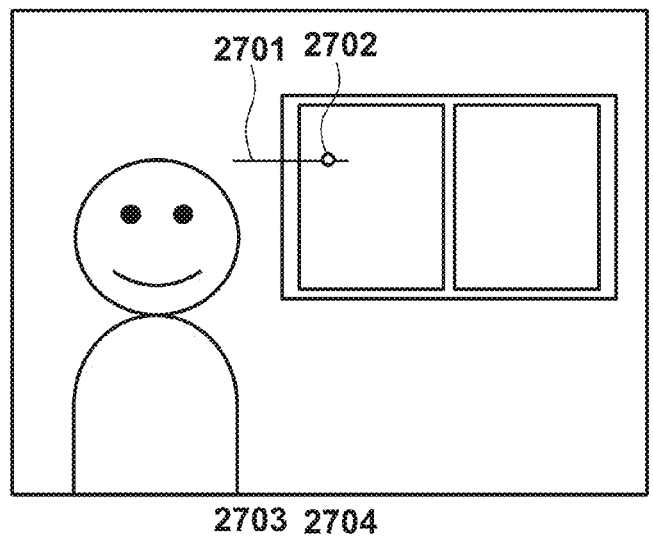
FIG. 27A is a view showing an example of an image shot under exposure adjusted for a person.
Figure 27B:
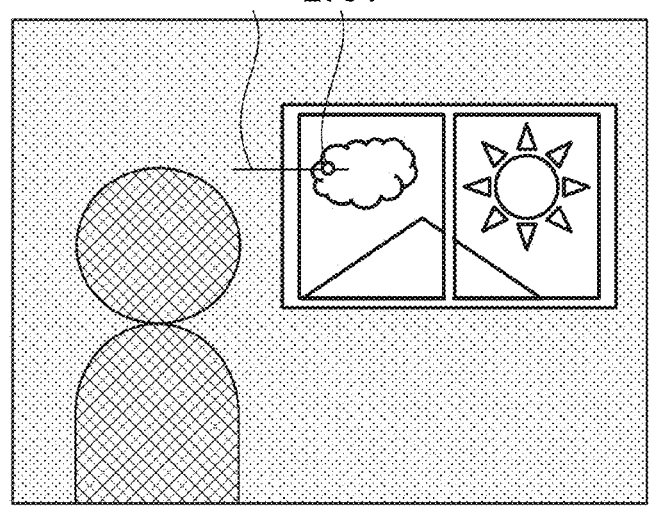
FIG. 27B is a view showing an example of an image shot under exposure adjusted for the outside scene.
Figure 28A:
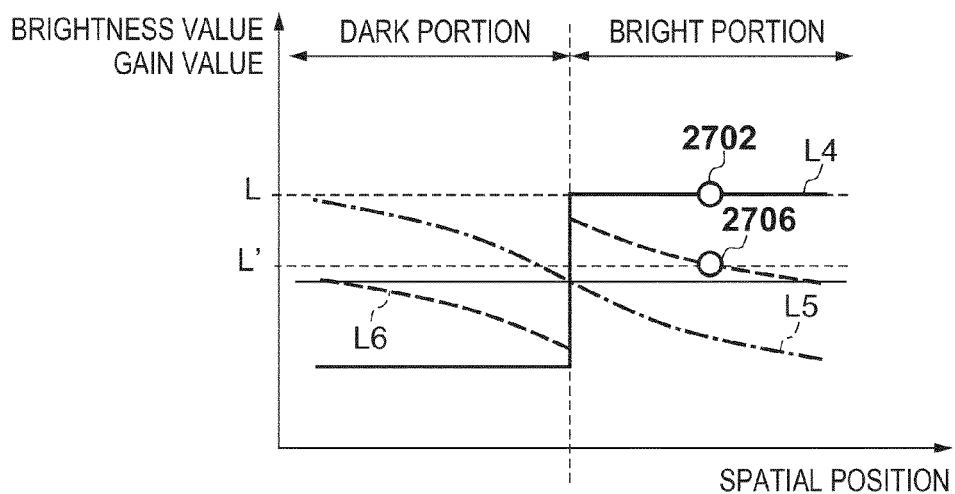
FIG. 28A is a graph showing changes in the brightness value at positions corresponding to FIGS. 27A and 27B.

FIG. 28A show the brightness values of pixels corresponding to horizontal lines 2701 and 2703 shown in FIGS. 27A and 27B and the gain values used for brightness correction. The horizontal lines 2701 and 2703 indicate the identical pixel positions of the two images.

Assume that the brightness at the position of the horizontal line 2701 in an image obtained by performing white balance adjustment for the correct exposure image (FIG. 27A) is represented by L4. When the gain value of each pixel obtained in the above-described way for the white-balance-adjusted image is L5, the brightness after brightness correction is represented by L6. For example, a brightness L of a pixel 2702 shown in FIG. 27A is corrected to a brightness L' indicated by 2706 in FIG. 28A.

Figure 27C:
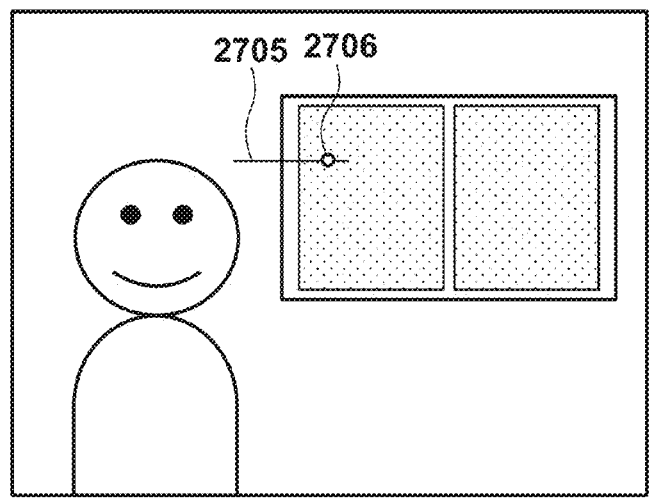
FIG. 27C is a view showing an example of an image obtained by applying brightness correction to the image shown in FIG. 27A.

FIG. 27C schematically shows an image obtained by applying brightness correction to the image obtained by performing white balance adjustment for the correct exposure image shown in FIG. 27A. Since the entire screen is corrected to a predetermined brightness by the brightness correction, the image after the brightness correction has a brightness difference smaller than that in the original image.

As described above, when determining the compositing ratio based on the brightness value of the reference image, the compositing ratio may change between the case in which the reference image is brightness-corrected and the case in which the reference image is not brightness-corrected. An example is a case in which the brightness value steps across the above-described first threshold or second threshold before and after the brightness correction when compositing by pixel selection (the compositing ratio is 0% or 100%). When an intermediate compositing ratio is provided, as shown in FIG. 18, the compositing ratio changes in more cases.

Figure 26:
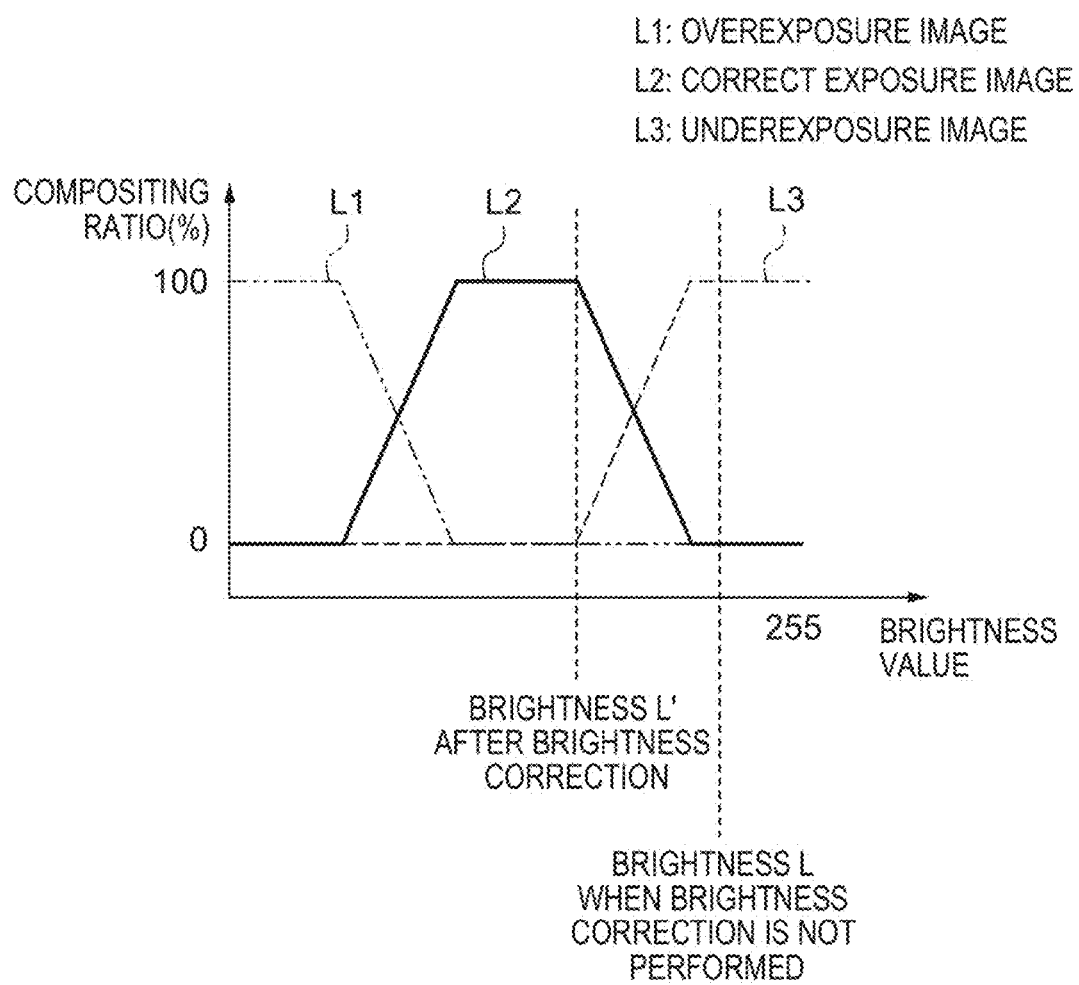
FIG. 26 is a view for explaining an example in which the compositing ratio changes upon brightness correction of a reference image.

FIG. 26 shows the change in the compositing ratio caused by the change in the brightness value upon brightness correction in an example in which the compositing ratio shown in FIG. 18 is used. When the brightness correction is not performed, at the brightness L of the pixel 2702, a pixel (pixel 2704 in FIG. 27B) of an underexposure image L3 is employed in the composited image at a ratio of 100%. On the other hand, at the brightness L' of the pixel 2702 after the brightness correction, a pixel (pixel 2706 in FIG. 27C) of a reference image L2 after the brightness correction is employed in the composited image at a ratio of 100%.

Figure 28B:
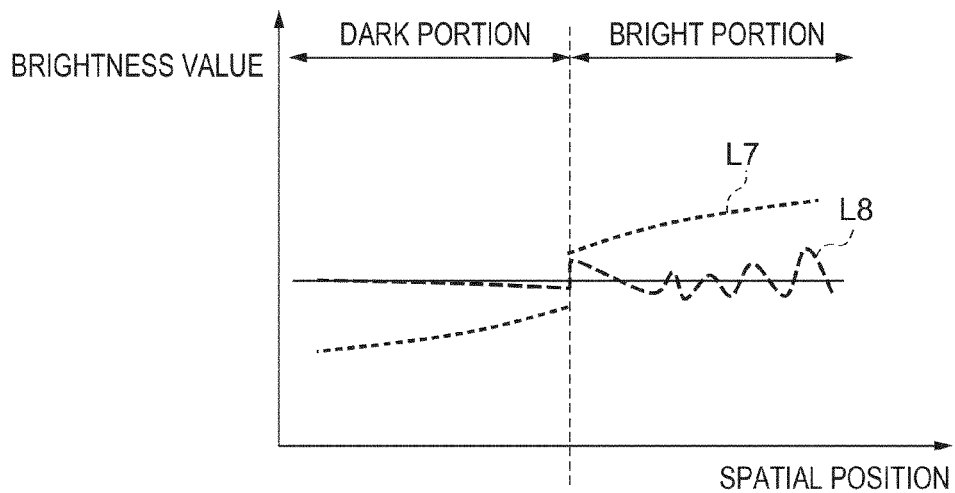
FIG. 28B is a graph showing an example of a brightness change in a composited image in a case in which a brightness-corrected image is used as the reference image and in a case in which an image that is not brightness-corrected is used as the reference image.

FIG. 28B shows examples of a change in the brightness value of pixels corresponding to the horizontal line 2701 of the composited image in the case in which the brightness-corrected image is used as the reference image and the case in which the image that is not brightness-corrected is used as the reference image. A composited image L7 obtained when the brightness-corrected image is used as the reference image mainly employs the pixels of the correct exposure image in the bright portion. Hence, the brightness of the outside scene is high, and the tonality is poor. On the other hand, a composited image L8 obtained when the image that is not brightness-corrected is used as the reference image mainly employs the pixels of the underexposure image. Hence, the tone of the outside scene remains in the composited image result.

As described above, when the compositing is performed using the brightness-corrected image as the reference image, the compositing processing may be performed against the purpose of widening the dynamic range.

In addition, the image output from the brightness correction unit 1204 is brightness-corrected on the region basis. For this reason, an extreme tone change may occur at the border between the dark portion and the bright portion in the image after brightness correction, as indicated by L6 in FIG. 28A.

When the compositing ratio is determined using such an image as the reference image, the extreme tone change in the reference image is reflected on the composited image as well. In this embodiment, however, the correct exposure image that is not brightness-corrected is used as the reference image to determine the compositing ratio, thereby widening the dynamic range and suppressing an inappropriate tone change in the composited image.

(Sixth Embodiment)

Figure 29:
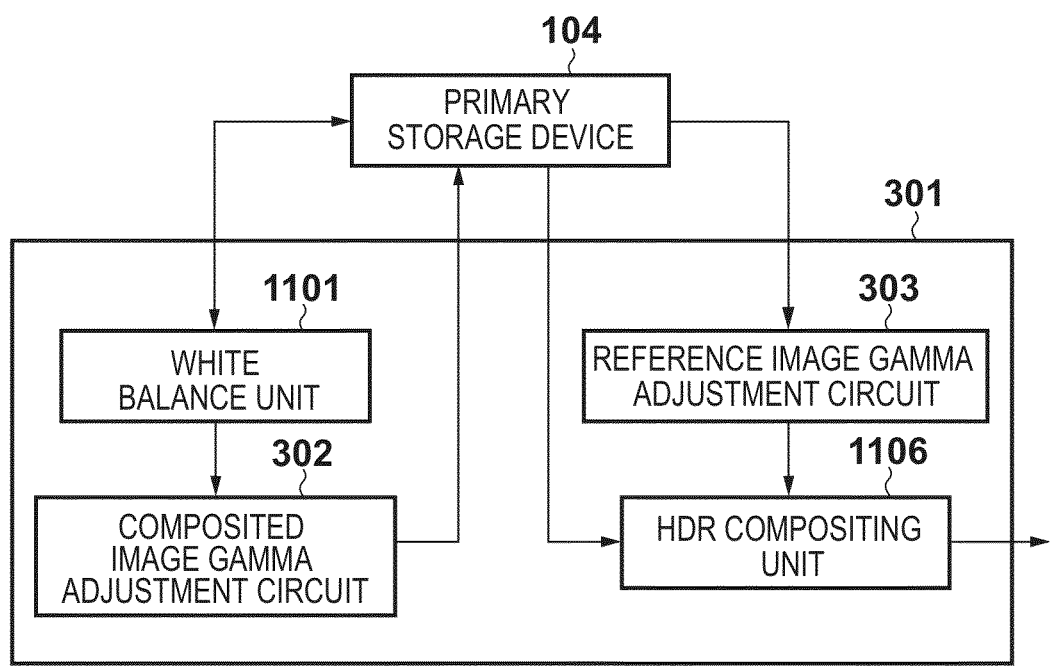
FIG. 29 is a block diagram of a function associated with generation of a composited image having a wider dynamic range out of an image processing apparatus 301 included in the image capture apparatus 100 that is an example of an image processing apparatus according to the sixth embodiment of the present invention.
Figure 30:
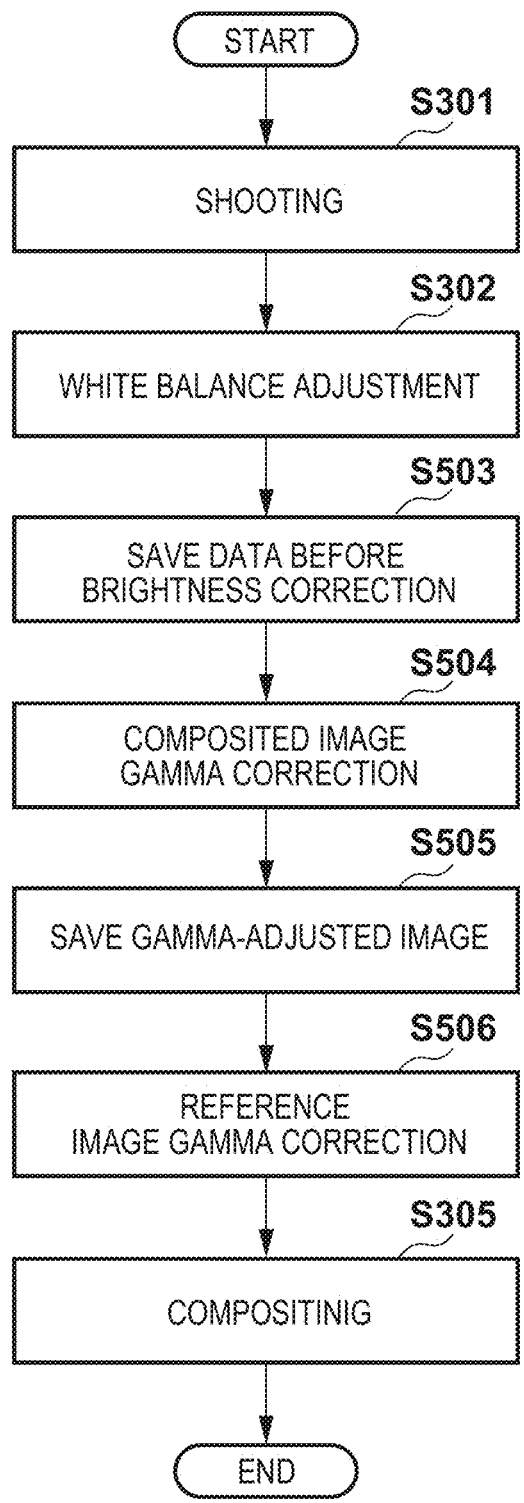
FIG. 30 is a flowchart showing the procedure of composited image generation processing according to the sixth embodiment of the present invention.

FIG. 30 is a flowchart showing the procedure of composited image generation processing according to this embodiment. The composited image generation processing will be described below with reference to FIGS. 1, 29, and 30. Note that the same step numbers as in FIG. 25 represent the same processes in FIG. 30, and a description thereof will be omitted.

Steps S301, S302, and S503 are the same processes as in the fifth embodiment.

In step S504, a CPU 103 causes a composited image gamma adjustment circuit 302 to perform gamma correction using a gamma curve stored in a secondary storage device 105 in advance for image data after white balance adjustment, which is obtained in step S503. More specifically, the gamma correction can be performed using a lookup table representing the gamma curve.

In this embodiment, the gamma curve used for the gamma correction is adjusted in accordance with the exposure of the image such that the input/output characteristic of the output device becomes linear, thereby performing gamma correction of the image for the composited image. For example, if the exposure value is smaller than a predetermined reference value (correct exposure), the gamma curve is adjusted to such a characteristic that compresses the tones of low frequencies while leaving the tones of intermediate to high frequencies. To the contrary, if the exposure value is larger than the reference value (correct exposure), the gamma curve is adjusted to such a characteristic that compresses the tones of high frequencies while leaving the tones of low to intermediate frequencies. The gamma curve is not adjusted for an image shot under correct exposure.

Note that normal gamma correction is performed to reproduce the tonality of the original image output from the output device and is not equivalent to actual brightness correction. Hence, in this embodiment, brightness correction is not actually performed for the image shot under correct exposure even when it is used for compositing, like the reference image. Hence, the image after the gamma correction can be used as the reference image. Alternatively, the processing in step S504 may be executed only for image data that is not shot under correct exposure.

In step S505, the CPU 103 stores the gamma-corrected image data to be used for image compositing, which is obtained in step S504, in a primary storage device 104. The image data stored here is used later in step S507.

In step S506, the CPU 103 causes a reference image gamma adjustment circuit 303 to perform brightness correction for the data of the correct exposure image after white balance adjustment before gamma adjustment, which is stored in the primary storage device 104 in step S503. This brightness correction is done using a lookup table corresponding to a reference image gamma curve (normal gamma curve), which is stored in the secondary storage device 105 in advance.

FIG. 31 shows examples of the reference image gamma curve and the composited image gamma curve. In this embodiment, the gamma correction of the reference image is performed using a lookup table that represents a linear gamma curve that is not compressed or decompressed locally in accordance with the input, as indicated by L7 in FIG. 31. However, as described above, if the gamma characteristic of the output device is linear, a corresponding gamma curve is used to perform the gamma correction.

Note that if the image shot under correct exposure has already gamma-corrected in step S504, the image may be used as the reference image, and the process in step S506 may be omitted. In this case, the reference image gamma adjustment circuit 303 is also unnecessary.

In step S305, the CPU 103 causes an HDR compositing unit 1106 to receive
  an image shot under underexposure or overexposure and gamma-corrected using a gamma curve adjusted from the normal gamma curve in step S505, and
  an image obtained by applying the normal gamma curve to the image shot under correct exposure in step S505 (or/and an image obtained by applying the normal gamma curve to the image shot under correct exposure in step S506), and composite the images for each pixel based on a predetermined compositing ratio, thereby obtaining a composited image.

As described above, in this embodiment, the reference image can also be used as the image to be composited (or an image obtained by performing gamma correction for the image shot under correct exposure can also be used as the reference image). For this reason, when shooting is performed three times under underexposure, correct exposure, and overexposure in step S301, as in the fifth embodiment, three or four images are input to the HDR compositing unit 1106. However, the processing of obtaining the compositing ratio in accordance with the brightness of the reference image and compositing the images is the same as in the fifth embodiment.

As described above, the same effect as in the fifth embodiment can be obtained by the sixth embodiment as well.

Note that in the above-described third to sixth embodiments, the present invention is applied to the image capture apparatus. However, the present invention can be practiced even in an apparatus that has no image capture function, as can easily be understood by those skilled in the art. For example, data of a plurality of image data obtained by bracket shooting are obtained via a recording medium or a network, and processing from step S302 of the above-described flowchart is executed. Which one of the plurality of images obtained by bracket shooting is the correct exposure image is determined either by image processing or using information recorded in the image data as metadata. If the order of bracket shooting is known in advance, for example, the shooting is performed in the order of correct exposure, overexposure, and underexposure, the determination may be done simply based on the recording date/time or file name.

Exemplary embodiments of the present invention have been described above. However, the present invention is not limited to these embodiments, and various changes and modifications can be made without departing from the spirit and scope of the present invention.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2012-021338, 2012-021342, and 2012-021343, filed on Feb. 2, 2012, which are here by incorporated by reference herein their entirety.

What is claimed is:

1. An image processing apparatus for converting an original image, comprising:
    an adjustment unit configured to apply a process of blurring to the original image and a process of adjusting a density to the blurred original image to generate an adjusted image;
    a computing unit configured to generate a difference image that is a difference between the original image and the adjusted image obtained by the adjustment unit; and
    a compositing unit configured to composite the difference image and the original image based on a density of the difference image obtained by the computing unit and a density of the original image,
    wherein the adjustment unit adjusts a level of blurring of the original image in accordance with one of a shooting setting of the original image and an object included in the original image, the object being determined by an image analysis of the original image.

2. The apparatus according to claim 1, wherein the adjustment unit adjusts a level of adjustment of the density in accordance with one of the shooting setting of the original image and an image signal of the original image.

3. The apparatus according to claim 1, further comprising, a normalization unit configured to normalize the density of the difference image obtained by the computing unit and output the normalized difference image, and
    wherein the compositing unit composites the normalized difference image and the original image based on a density of the normalized difference image and the density of the original image.

4. The apparatus according to claim 1, wherein using a predetermined density in the difference image as a reference density, the compositing unit performs different conversions for a pixel whose density is higher than the reference density and a pixel whose density is lower than the reference density.

5. The apparatus according to claim 4, wherein the original image comprises an image obtained by shooting an object a plurality of times under different exposures and compositing the plurality of captured image signals.

6. The apparatus according to claim 1, wherein letting BG be a density of each pixel of the original image, FG be a density of each pixel of the image input to the compositing unit, which corresponds to the original image, R be a density of each pixel of the image output from the compositing unit, and q be the number of bits of each image, $$R = (2^q - 1) - 2 \times ((2^q - 1) - BG) \times ((2^q - 1) - FG)/2^q \text{ (when } FG \geq 2^{q-1})$$

$$R = 2 \times BG \times FG/2^q \text{ (when } FG < 2^{q-1})$$

hold for the compositing unit.

7. A method of controlling an image processing apparatus for converting an original image, comprising:
    applying, by a processor, the process of blurring to the original image and a process of adjusting a density to the blurred original image to generate an adjusted image;
    generating, by a processor, a difference image that is a difference between the original image and the adjusted image; and
    compositing, by a processor, the difference image and the original image based on a density of the difference image and a density of the original image,
    wherein the applying step adjusts a level of blurring of the original image in accordance with one of a shooting setting of the original image and an object included in the original image, the object being determined by an image analysis of the original image.

8. A method of controlling an image processing apparatus for converting an original image, comprising:
    applying, by a processor, processing of blurring to the original image and a process of adjusting a density to the blurred original image to generate an adjusted image;
    generating, by a processor, a difference image that is a difference between a density of the original image and a density of the adjusted image; and
    compositing, by a processor, the difference image and the original image based on a density of the difference image and a density of the original image,
    wherein the applying step adjusts a level of blurring of the original image in accordance with one of a shooting setting of the original image and an object included in the original image, the object being determined by an image analysis of the original image.

9. The apparatus according to claim 1, wherein the adjustment unit adjusts a level of blurring of the original image in accordance with a shooting mode used to capture the original image.

10. The apparatus according to claim 9, wherein if the shooting mode is a landscape mode, the adjustment unit increases the level of blurring than in a case where another shooting mode is used to capture the original image.

11. The apparatus according to claim 1, further comprising an image analysis unit configured to analyze an image signal of the original image,
   wherein the adjustment unit adjusts a level of blurring of the original image in accordance with a result of the analysis of the image analysis unit.

12. The apparatus according to claim 11, wherein if the image analysis unit detects a person in the original image by the analysis, the adjustment unit increases the level of blurring than in a case where the image analysis unit does not detect a person in the original image by the analysis.

* * * * *